US012340685B2

(12) United States Patent
Boenisch

(10) Patent No.: US 12,340,685 B2
(45) Date of Patent: Jun. 24, 2025

(54) TRAFFIC MANAGEMENT DEVICE, TRAFFIC MANAGEMENT SYSTEM, TRAFFIC INFORMATION SYSTEM, STARTING MODULE THAT CAN BE RETROFITTED AND METHOD FOR MANAGING TRAFFIC

(71) Applicant: ETO MAGNETIC GmbH, Stockach (DE)

(72) Inventor: Benjamin Boenisch, Bodman-Ludwigshafen (DE)

(73) Assignee: ETO MAGNETIC GmbH, Stockach (DE)

( * ) Notice: Subject to any disclaimer, the term of this patent is extended or adjusted under 35 U.S.C. 154(b) by 223 days.

(21) Appl. No.: 17/909,096

(22) PCT Filed: Mar. 2, 2021

(86) PCT No.: PCT/EP2021/055151
§ 371 (c)(1),
(2) Date: Sep. 2, 2022

(87) PCT Pub. No.: WO2021/175833
PCT Pub. Date: Sep. 10, 2021

(65) Prior Publication Data
US 2023/0260393 A1 Aug. 17, 2023

(30) Foreign Application Priority Data
Mar. 4, 2020 (DE) ..................... 10 2020 105 840.3

(51) Int. Cl.
*G08G 1/01* (2006.01)
*G01S 13/02* (2006.01)
(Continued)

(52) U.S. Cl.
CPC ........ *G08G 1/0116* (2013.01); *G01S 13/0209* (2013.01); *G01S 13/91* (2013.01);
(Continued)

(58) Field of Classification Search
CPC .. G08G 1/0116; G08G 1/0141; G08G 1/0145; G08G 1/015; G08G 1/04;
(Continued)

(56) References Cited

U.S. PATENT DOCUMENTS

2004/0130463 A1 7/2004 Bloomquist et al.
2005/0174279 A1 8/2005 Voigtlaender
(Continued)

FOREIGN PATENT DOCUMENTS

CN 202549060 U 11/2012
CN 204537469 U 8/2015
(Continued)

OTHER PUBLICATIONS

Office Action mailed Sep. 26, 2023 issued in corresponding Japanese Patent Application No. 2022-552892 (and English summary).
(Continued)

*Primary Examiner* — Nga X Nguyen
(74) *Attorney, Agent, or Firm* — Posz Law Group, PLC

(57) ABSTRACT

A traffic management device, in particular a stationary traffic management device, preferably for managing at least partially and/or at least time-segment-wise self-driving vehicles, includes one or more sensor modules having one or more sensors that sense one or more items of information and/or one or more parameters of one or more objects moving in a field of view of the sensor(s). The sensor is embodied as an ultra-wideband sensor.

25 Claims, 12 Drawing Sheets

Figure 1:
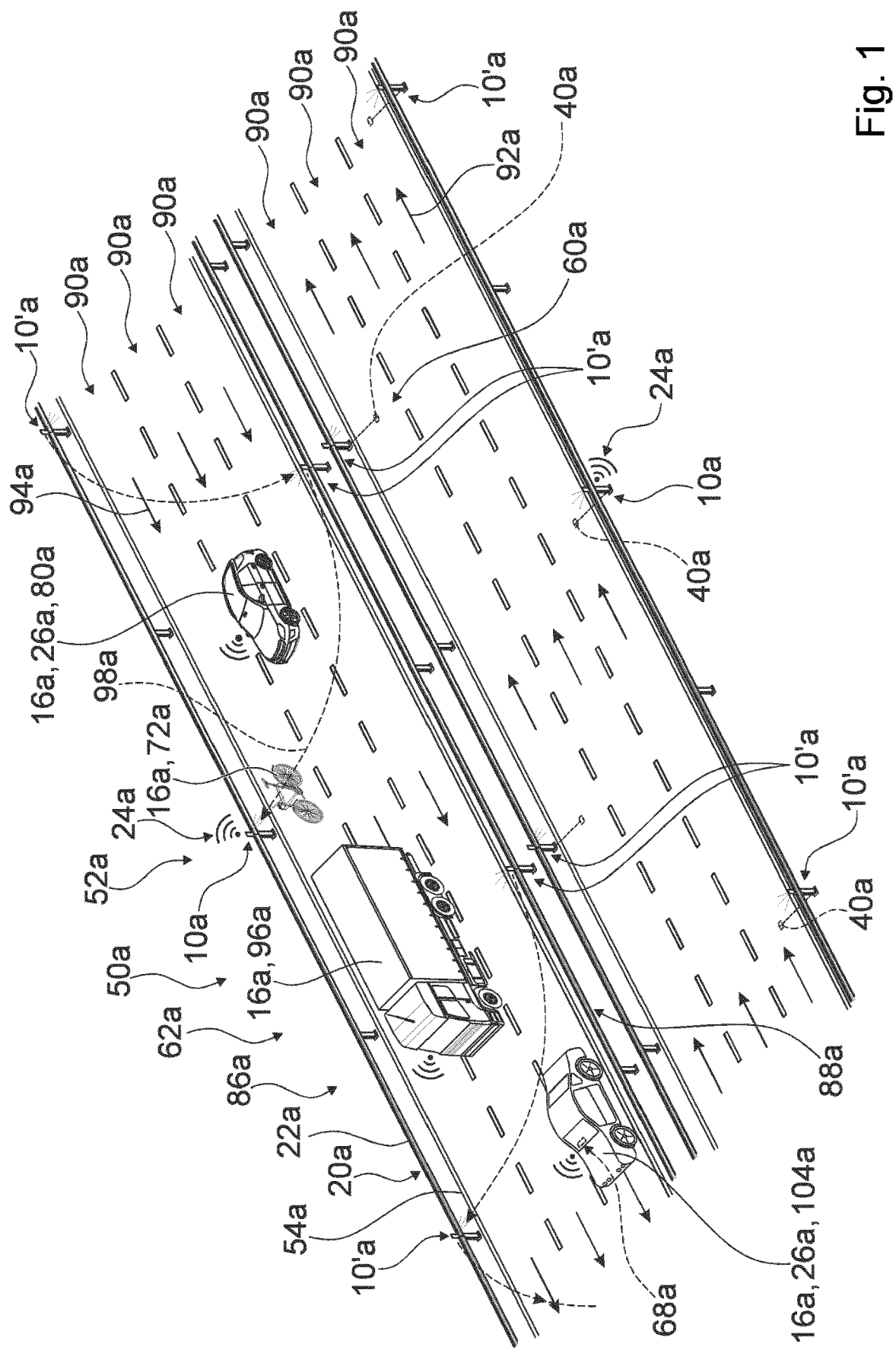

(51) Int. Cl.
| | |
|---|---|
| *G01S 13/91* | (2006.01) |
| *G08G 1/015* | (2006.01) |
| *G08G 1/04* | (2006.01) |
| *G08G 1/052* | (2006.01) |
| *G08G 1/056* | (2006.01) |
| *G08G 1/0967* | (2006.01) |
| *H04L 9/00* | (2022.01) |

(52) U.S. Cl.
CPC ......... *G08G 1/0141* (2013.01); *G08G 1/0145* (2013.01); *G08G 1/015* (2013.01); *G08G 1/04* (2013.01); *G08G 1/052* (2013.01); *G08G 1/056* (2013.01); *G08G 1/096783* (2013.01); *H04L 9/50* (2022.05); *H04L 2209/84* (2013.01)

(58) Field of Classification Search
CPC .. G08G 1/052; G08G 1/056; G08G 1/096783; G08G 5/0013; G08G 5/0026; G08G 5/065; G08G 1/0133; G08G 1/096716; G08G 1/096725; G08G 1/096758; G08G 1/164; G08G 1/168; G08G 1/0175; G08G 1/02; G08G 1/167; G08G 5/22; G08G 5/26; G08G 5/51; G01S 13/0209; G01S 13/91; G01S 13/87; H04L 9/50; H04L 2209/84; H04L 67/104; H04L 67/12; G06V 20/52; G06V 20/56; G06V 20/588; G06V 20/625; G06V 20/54; H04W 4/024; H04W 4/38; H04W 4/44; H04W 4/40; G06N 20/00; B60W 60/001; B60W 2420/403; B60W 2552/20; B60W 2552/53; B60W 2050/143; B60W 2420/54; B60W 50/14; B60W 30/12; E01F 11/00
See application file for complete search history.

(56) References Cited

U.S. PATENT DOCUMENTS

| | | | |
|---|---|---|---|
| 2010/0308816 | A1 | 12/2010 | Ueda et al. |
| 2015/0348417 | A1 | 12/2015 | Ignaczak et al. |
| 2016/0035221 | A1* | 2/2016 | McDevitt-Pimbley ................. G08G 1/0133 701/119 |
| 2018/0336782 | A1* | 11/2018 | Chase ................. G05D 1/243 |
| 2019/0287063 | A1* | 9/2019 | Skaaksrud ......... G06Q 10/0832 |
| 2019/0287318 | A1 | 9/2019 | Fukuhara et al. |
| 2021/0045218 | A1 | 2/2021 | Secretin et al. |
| 2021/0056841 | A1* | 2/2021 | Lais ................. H04W 76/10 |
| 2021/0129864 | A1* | 5/2021 | Wang ................. H04W 4/40 |
| 2022/0179061 | A1* | 6/2022 | Li ................. G01S 13/878 |
| 2022/0335819 | A1* | 10/2022 | Heinla ................. G08G 1/0141 |
| 2022/0335829 | A1* | 10/2022 | Millington ......... G01C 21/3685 |

FOREIGN PATENT DOCUMENTS

| | | |
|---|---|---|
| DE | 102007057818 A1 | 6/2009 |
| DE | 102017212644 A1 | 1/2019 |
| JP | 2990267 B1 | 12/1999 |
| JP | 2005092415 A | 4/2005 |
| JP | 2005537485 A | 12/2005 |
| JP | 2008286582 A | 11/2008 |
| JP | 2011027514 A | 2/2011 |
| JP | 2016045211 A | 4/2016 |
| JP | 2017-063381 A | 3/2017 |
| JP | 2019-161434 A | 9/2019 |
| KR | 20190013237 A | 2/2019 |
| WO | 2009057626 A1 | 5/2009 |
| WO | 2019/175435 A2 | 9/2019 |

OTHER PUBLICATIONS

Chinese Office Action dated Jun. 1, 2023 issued in corresponding Chinese Patent Application No. CN 202180018776.4 (and English summary of the Office Action by the Chinese colleagues).
Office Action mailed Jan. 26, 2024 in corresponding Chinese Patent Application No. 202180018776.4 (and English Summary).
Office Action mailed Mar. 22, 2024 in corresponding European Patent Application No. 21711766.2 (and English translation).
Office Action mailed Mar. 26, 2024 in corresponding Japanese Patent Application No. 2022-552892 (and English Summary).
Office Action mailed Aug. 22, 2024 in corresponding Indian Patent Application No. 202217053760 (and English Translation).
Office Action mailed Jun. 8, 2024 in corresponding Chinese Patent Application No. 202180018776.4 (and English Summary).
Sachs, J. et al. "M-Sequence Ultra-Wideband-Radar: State of Development and Applications." 2003, p. 224-229.
Roos, F. et al. "Reliable Orientation Estimation of Vehicles in High-Resolution Radar Images." IEEE Transactions on Microwave Theory and Techniques, vol. 64, No. 9, Sep. 2016.
Luber, S. et al. "What is Ultra Wideband / UWB / Ultra Broadband?" IP Insider, Oct. 28, 2019 (and English machine translation).
Wolff, C. "Ultra Wideband Radar." Radartutorial.eu, accessed Nov. 24, 2020 (and English translation).
German Search Report dated Nov. 24, 2020 issued in corresponding German Patent Application No. DE 10 2020 105 840.3 (and English translation).
International Search Report of the International Searching Authority mailed Jun. 4, 2021 in corresponding international application No. PCT/EP2021/055151 (English Translation Only).
International Preliminary Report of Patentability of the International Searching Authority mailed Sep. 6, 2022 in corresponding international application No. PCT/EP2021/055151 (English Translation Only).
Office Action dated Dec. 3, 2024 issued for the corresponding Japanese Patent Application No. 2022-552892 (and English translation).

* cited by examiner

TRAFFIC MANAGEMENT DEVICE, TRAFFIC MANAGEMENT SYSTEM, TRAFFIC INFORMATION SYSTEM, STARTING MODULE THAT CAN BE RETROFITTED AND METHOD FOR MANAGING TRAFFIC

CROSS REFERENCE TO RELATED APPLICATIONS

This application is a U.S. national stage application of PCT/EP2021/055151 filed on Mar. 2, 2021, which claims priority from and incorporates herein by reference German patent application DE 102020105840.3 filed on Mar. 4, 2020.

PRIOR ART

The invention relates to a traffic management device, a traffic management system, a receiving module, a traffic information system and a method for managing traffic.

A traffic management device comprising at least one sensor module having at least one sensor that is configured for sensing at least one item of information and/or at least one parameter of at least one object moving in a field of view of the sensor has already been proposed.

The object of the invention consists in particular in providing a generic device having advantageous properties with regard to traffic management, in particular at high speeds and under confined space conditions. The object is achieved according to the invention.

Advantages of the Invention

The invention is based on a traffic management device, in particular a stationary traffic management device, preferably for managing at least partially and/or at least time-segment-wise self-driving vehicles, comprising at least one sensor module having at least one sensor configured for sensing at least one item of information and/or at least one parameter of at least one object moving in a field of view of the sensor.

It is proposed that the sensor is embodied as an ultra-wideband sensor. As a result, in particular even at high speeds (e.g. >20 km/h) and under confined space conditions (e.g. distances of less than 0.2 m), reliable and/or safe traffic management can advantageously be made possible. Advantageously, reliable and/or safe recognition of vehicles and/or speeds of vehicles in a close range of the sensor can be made possible. In particular, preferably automated, traffic guidance at roadway bottlenecks such as, for example, at construction sites with a narrowed roadway, at toll stations, such as are known inter alia from Italian interstate highways, at filling stations, in multistorey carparks, at parking lots, for example also during lateral parking in a very narrow parking space, at loading stations such as on ferries, automobile transporters, automobile-carrying trains, etc., can advantageously be made possible as a result. Moreover, relocating at least a portion of a sensor system for autonomous driving into an infrastructure makes it possible to achieve a significant reduction of the production costs of the autonomous vehicles since, advantageously, not every vehicle then need be equipped with its own complicated sensor system. Moreover, advantageously, maintenance of the safety-relevant sensor system can be facilitated and better supervised if the latter is introduced into an infrastructure, administered in particular by a traffic authority, rather than in the vehicles of private persons and companies. In addition, the proposed traffic management device is advantageously embodied in a manner free of any acquisition of personality-related data, such as, vehicle recognition or license plate recognition, in particular even free of just a theoretical possibility of vehicle recognition or license plate recognition. Advantageously, no cameras or the like are required for a reliable function of the traffic management device. As a result, advantageously, data protection reservations and/or objections can be avoided and a high degree of data protection can be maintained in road traffic.

A traffic management device should be understood to mean in particular a device, preferably a part of a traffic management system, preferably a part of a Car2x system, configured for capturing data from road users (for example position, speed, direction of travel, etc.), in particular in an automated manner. Preferably, the traffic management device is configured for processing the captured data, for example for mapping the positions and/or movement vectors of the captured road users. Particularly preferably, the traffic management device is configured for outputting the captured data and/or the processed data to road users. By way of example, it is conceivable for the traffic management device already to emit action instructions and/or control data to the road users. Alternatively or additionally, it is conceivable for the traffic management device to emit the captured traffic data to the road users, with the latter processing these data themselves in particular in combination with further sensor data determined directly by the road users, in control data for controlling the road users. A "stationary traffic management device" should be understood to mean in particular a traffic management device which is at least substantially nonmovable. Preferably, the stationary traffic management device is fixedly connected to an infrastructure, for example a road network, a rail network or a maneuvering area, or is positioned in a stationary manner relative to the infrastructure. Preferably, the stationary traffic management device is free of an individual assignment to a specific road user, in particular vehicle. In this context, "management" should be understood to mean in particular at least provision of—these preferably being processable in terms of data processing technology—items of information and/or control data which are usable for supervision of a vehicle, in particular of driving behavior of a vehicle. Preferably, the traffic management device is configured for making accessible to a road user data about other road users situated outside a field of view of the road user or sensors of the road user. By way of example, the traffic management device is configured for making accessible to a road user data about further road users situated behind a corner, behind an obstacle or in front of further road users in the traffic flow.

In particular, at least a portion of the road users are at least partially and/or at least time-segment-wise self-driving vehicles, in particular motor vehicles. Alternatively or additionally, at least a portion of the road users can also be aircraft, rail vehicles, ships or else cyclists, pedestrians and/or animals. In particular, the traffic management device is embodied as a road traffic management device. Alternatively or additionally, however, it is also conceivable for the traffic management device to be embodied as a railroad traffic management device, an aircraft taxiing traffic management device, a management device for positioning an aircraft gangway relative to an aircraft or the like. An at least partially self-driving vehicle is in particular a vehicle which can carry out at least a portion of the control tasks, for example speed control, braking control and/or steering control, independently, i.e. in a manner free of permanent operator supervision. By way of example, a vehicle having a cruise control, such as e.g. a Distronic system, or a vehicle having a lane keeping assistant constitutes an at least partially self-driving vehicle. By way of example, a vehicle having a fully automatic parking assistant or a vehicle having a deactivatable autopilot constitutes an time-segment-wise self-driving vehicle. In particular, the road user can also be a fully autonomous robotic automobile. "Configured" should be understood to mean in particular specifically programmed, designed and/or equipped. The fact that an object is configured for a specific function should be understood to mean in particular that the object fulfils and/or carries out said specific function in at least one application state and/or operating state.

"Sensor" should preferably be understood to mean a technical component which can detect the at least one physical property, preferably a plurality of physical properties, of its environment. In particular, the sensor is configured for detecting spatial, preferably moving, objects, in particular road users, and/or for determining information about physical properties of said objects, in particular road users. In particular, the sensor has a field of view, within which the sensor is able to sense objects. Preferably, besides recognizing rapidly moving objects, the sensor is also able to sense very slowly moving objects or objects at a standstill, for example in the case of traffic congestion.

An "ultra-wideband sensor" should be understood to mean in particular a sensor that emits electromagnetic waves, in particular wave packets, the emitted electromagnetic waves/wave packets having a particularly large bandwidth, preferably a bandwidth of more than 500 MHz. Preferably, the ultra-wideband sensor is embodied as an ultra-wideband radar sensor. In particular, the ultra-wideband sensor detects a reflection signal of the emitted electromagnetic waves/wave packets in order to recognize the objects moving in the field of view of the sensor. Preferably, the ultra-wideband sensor senses a frequency difference of the reflection signal and/or a time of flight difference of the reflection signal, a distance of the reflecting object being deducible in particular from the frequency difference and/or from the time of flight difference. Advantageously, by increasing a bandwidth of a measurement signal, it is possible to achieve an increase in a measurement resolution and thus a reduction of a spacing of minimally differentiable measurement distances of a sensor. Preferably, the ultra-wideband sensor is operated in a continuous fashion. Preferably, the ultra-wideband sensor does not emit pulse signals, and so advantageously there is no need for a measurement interruption for receiving pulse responses. As a result, advantageously, a particularly high measurement speed can be made possible, which allows in particular a high measurement accuracy and/or a measurement of objects at particularly high speed. Alternatively, however, it is also conceivable for the ultra-wideband sensor to be operated in a pulsed fashion. Advantageously, a use of ultra-wideband sensor technology additionally makes it possible to prevent influencing of and/or interference with other radio transmission methods, in particular other narrowband radio transmission methods, such as, for example, LoRA, 5G or WLAN (in particular 802.11p).

Furthermore, it is proposed that the ultra-wideband sensor is based on an M-sequence technology. As a result, advantageously, it is possible to achieve particularly accurate speed recognition, in particular even of high speeds, of objects moving in the field of view of the sensor, preferably even when the objects are at particularly small distances from the sensor. Advantageously, M-sequence signals have lower noise, in particular in comparison with (UWB) pulse signals and/or with (UWB) sinusoidal signals. Advantageously, M-sequence signals have little susceptibility to interference, in particular in comparison with (UWB) pulse signals and/or (UWB) sinusoidal signals. Advantageously, M-sequence signals, in particular in comparison with (UWB) pulse signals and/or (UWB) sinusoidal signals, cause little interference with other applications, for example narrowband radio applications such as LoRA, 5G or WLAN (in particular 802.11p). Advantageously, M-sequence signals, in particular in comparison with (UWB) pulse signals and/or with (UWB) sinusoidal signals, are influenced and/or interfered with only to a small extent by signals of other radio sources, for example narrowband radio applications such as LoRA, 5G or WLAN (in particular 802.11p). Advantageously, the M-sequence signals enable a simultaneous measurement over an entire (UWB) frequency range of the sensors, such that thousands of measurements per second can be made possible. An "M-sequence" should be understood to mean in particular a pseudorandom, binary sequence known by the technical term "Maximum Length Sequence". In particular, the M-sequence constitutes a pseudonoise sequence. In particular, the M-sequence has a flat frequency spectrum which is preferably similar to white noise. In particular, the ultra-wideband sensor is configured for generating and emitting a signal, in particular pseudonoise signal, based on the M-sequence and/or formed by an M-sequence. In particular, the M-sequence signal is able to be generated by means of feedback shift registers. In particular, the sensor module comprises at least one circuit for generating the M-sequence, which preferably has an N-stage shift register for generating the M-sequence. In particular, the ultra-wideband sensor comprises a transmitting unit, which generates and emits an M-sequence transmission signal. In particular, the ultra-wideband sensor comprises a receiving unit, which receives portions of the M-sequence transmission signal reflected by an object. In particular, the ultra-wideband sensor comprises an evaluation unit, which evaluates the received reflected M-sequence transmission signal and determines at least one distance of the reflecting object therefrom. Advantageously, the measurement and the measurement result of the ultra-wideband sensor using M-sequence technology are at least substantially uninfluenced by layers of dirt and/or of ice and by rain and/or fog in the region of a measurement path of the ultra-wideband sensor.

In addition, it is proposed that the ultra-wideband sensor operates in a frequency range of between 100 MHz and 6 GHz with a bandwidth of at least 500 MHz, with preference at least 1 GHz, preferably at least 2 GHz, more preferably at least 4 GHz and particularly preferably of at least 5.5 GHz, and/or in a frequency range of between 6 GHz and 8.5 GHz with a bandwidth of at least 500 MHz, with preference at least 1 GHz, preferably at least 1.5 GHz, more preferably at least 2 GHz and particularly preferably of at least 2.5 GHz. As a result, in particular mutual, interference by further radio sources such as, for example, LoRA, 5G or WLAN (in particular 802.11p) can advantageously be avoided. Advantageously, in particular as a result of the high bandwidth of the frequency range of between 6 GHz and 8.5 GHz, it is possible to achieve a particularly high spatial resolution and/or a particularly small minimum measurement distance. Moreover, advantageously, no radio licenses are required for these frequency ranges, in particular if a transmission power is in a range of −41.3 dbm/MHz. Preferably, the transmission power of the ultra-wideband sensor is −41.3 dbm/MHz or less. In particular, the frequency band of between 100 MHz and 6 GHz is configured at least for a measurement of a fog density. In particular, the frequency band of between 6 GHz and 8.5 GHz is configured at least for a distance measurement, in particular even in the close range of the sensor. In particular, it is conceivable for the sensor module, in particular the sensor or at least two sensors of the sensor module, to measure and/or to be operated at least partially simultaneously or alternately in both frequency bands (100 Mhz to 6 GHz and 6 GHz to 8.5 GHz). As a result, a close range distance measurement and a fog density determination, both being important parameters for at least partially autonomous driving of a vehicle, can advantageously be combined in one sensor module.

If the usable field of view of the sensor, in particular besides a far range, comprises a portion of a close range of the sensor, reliable and/or safe traffic management can advantageously be made possible, in particular even at high speeds (e.g. >20 km/h) and under confined space conditions (e.g. distances of less than 0.2 m). In particular, preferably automated, traffic guidance at roadway bottlenecks can advantageously be made possible as a result. A "usable field of view" should be understood to mean in particular the portion of the field of view of the sensor in which a reliable distance measurement of objects moving in the field of view relative to the sensor is possible. A "reliable distance measurement" should be understood to mean in particular a distance measurement with an accuracy of at least 10 cm, with preference at least 5 cm, preferably at least 3 cm and particularly preferably at least 1.5 cm. In this context, a "close range" should be understood to mean in particular a range formed from points that are at a distance from the sensor, in particular from the transmitting unit of the sensor and/or from the receiving unit, which is at most 0.5 m, with preference at most 0.3 m, advantageously at most 0.2 m, preferably at most 0.1 m and particularly preferably at most 0.05 m. Advantageously, the ultra-wideband sensor is able to measure in a range of the sensor in which conventional lidar and/or radar measuring instruments are blind, in particular owing to their having transmission pulse and reception pulse lengths of finite extent.

Furthermore, it is proposed that the sensor module is dimensioned in such a way that it is able to be integrated in a roadway boundary, in particular a roadway boundary element such as a guard rail, a guide post, a railroad crossing gate and/or a warning beacon. Simple integrability into an existing infrastructure can advantageously be achieved as a result. Advantageously, positioning of the sensor particularly close to the roadway can be made possible. As a result, high compactness of the traffic management device can advantageously be achieved, in particular in spatially confined situations, such as, for example, in the case of roadway narrowering caused by a construction site. Advantageously, there is no need to construct additional mounting pylons, such as, for example, sensor bridges over interstate highways. As a result, particularly close-mesh coverage of a traffic route, in particular of a road, with sensors of the traffic management device can advantageously be achieved in a simple manner. The roadway boundary is embodied in particular as a road boundary, as a railroad section boundary, as a taxiway boundary, as a parking space boundary, for example on a ferry or the like. In particular, the roadway boundary is embodied as a stationary roadway boundary. However, it is also conceivable for the sensor module to be integrated in an at least partially mobile roadway boundary, such as, for example, a construction site warning beacon or a railroad crossing gate or the like. Preferably, the sensor module, in particular a housing surrounding the sensor module, is dimensioned in such a way that its maximum extent in at least two mutually perpendicular spatial direction is less than 15 cm, with preference less than 10 cm and preferably less than 7 cm. Preferably, a smallest imaginary parallelepiped that completely encloses the sensor module, in particular the housing surrounding the sensor module, has at least two mutually perpendicular side edges which are smaller than 15 cm, with preference smaller than 10 cm and preferably smaller than 7 cm. Preferably, the smallest imaginary parallelepiped that completely encloses the sensor module, in particular the housing surrounding the sensor module, is smaller than 15 cm×15 cm×15 cm, advantageously smaller than 12 cm×12 cm×12 cm, more preferably smaller than 10 cm×10 cm×10 cm, even more preferably smaller than 7 cm×7 cm×7 cm and particularly preferably smaller than 5 cm×5 cm×5 cm.

Furthermore, it is proposed that the traffic management device has at least one radio module configured at least for emitting to at least one receiver, in particular at least to the at least partially and/or at least time-segment-wise self-driving vehicle, data, in particular position and/or speed data, based at least on the sensed information and/or sensed parameter of the at least one movable object. Advantageous traffic management can be made possible as a result. In particular, advantageously, the data determined by means of the sensor module can be received by the receiver and converted into control data, in particular motor vehicle control data, for example acceleration control, speed control, braking control, steering control, distance keeping control, lane keeping control or the like. In particular, the radio module is dimensioned in such a way that it is able to be integrated in the roadway boundary, for example the guard rail, the guide post, the railroad crossing gate and/or the warning beacon. In particular, the radio module is arranged in the same housing as the sensor module. Alternatively, however, it is also conceivable for the radio module to have a housing separate from the housing of the sensor module. Preferably, a smallest imaginary parallelepiped that completely encloses the radio module, in particular the housing surrounding the radio module, is smaller than 15 cm×15 cm×15 cm, advantageously smaller than 12 cm×12 cm×12 cm, more preferably smaller than 10 cm×10 cm×10 cm, even more preferably smaller than 7 cm×7 cm×7 cm and particularly preferably smaller than 5 cm×5 cm×5 cm. In particular, the radio module is configured for emitting the data by means of at least one known radio standard, for example by means of LoRa, by means of WLAN, in particular 802.11p, by means of 4G and/or by means of 5G. In addition, the radio module can moreover be configured for emitting data of further sensors of the traffic management device. In particular, the radio module comprises at least one transmitting antenna.

If the radio module is configured for emitting permanently and/or continuously repeatedly exact position data of the radio module and/or of one or more of the sensor modules, exact traffic guidance can advantageously be achieved. Advantageously, the traffic management device can be arranged directly at the roadway edge, can communicate the position data of the roadway edge to the receivers and can recognize at the same time vehicles traveling very closely past the roadway edge, in particular in the close range of the sensors. "Exact position data" should be understood to mean in particular position data which are accurate at least to five centimeters, with preference at least to two centimeters, advantageously at least to one centimeter, preferably at least to 5 millimeters and particularly preferably at least to one millimeter. In particular, during mounting, the radio module is calibrated with millimeter accuracy and fixed in a stationary fashion. Alternatively or additionally, it is also conceivable for the radio module to emit internally determined position data. Moreover, it is conceivable for the radio module to be configured for emitting permanently and/or continuously repeatedly roadway data, such as, for example, a roadway width, a number of lanes, a lane width or the like. As a result, advantageously, it is possible to achieve safe traffic guidance, in particular even at bottlenecks, without sensor modules and radio modules necessarily being required on both sides of the roadway. In particular, the radio module is configured for emitting data and/or items of information about any kind of objects captured by means of the sensor modules, preferably independently of whether these are being driven autonomously or under the control of the driver and/or independently of whether these can themselves receive data or not.

If, in addition, at least the data emitting by the radio module are encrypted by means of a blockchain technology or a digital ledger technology (DLT), in particular a DLT technology with a directed acyclic graphs (DAG) architecture, preferably a DLT technology with a transaction-based directed acyclic graphs (TDAG) architecture, high security, in particular high security against manipulation, preferably of the data emitted by the radio module, can advantageously be achieved. Advantageously, the data emitted by the radio module are at least substantially unalterable as a result. In particular, each radio module is provided with a digital identifier (ID), in particular with a digital ID encrypted by means of blockchain technology or DLT. As a result, advantageously, each received data packet can be digitally verified by the receiver and be assigned to a specific, for example officially registered, radio module. In particular, the data emitted by the radio module are encrypted by means of a DLT-ID, preferably an IOTA™-ID. Advantageously, an attractiveness of the determined data for third parties can be increased by means of blockchain or DLT encryption. By way of example, as a result, advantageously, it is possible to guarantee a reliability of determined weather data, traffic density data, location data, etc., for third parties. This advantageously enables an economic second use of the determined data.

Moreover, it is proposed that a radio module is assignable to a plurality of sensor modules that are positionable separately from one another, and/or that a radio module is configured for emitting data of a plurality of sensor modules that are positionable separately from one another. As a result, a high cost and/or energy efficiently can advantageously be achieved, in particular by virtue of the fact that not every sensor module need be directly assigned a powerful radio module. In particular, at least in this case, the radio module is embodied as a radio node configured for bundling data of a plurality of sensor modules and emitting them to the receivers. The radio node can be connected to the plurality of sensor modules in particular in a wired manner or preferably wirelessly. By way of example, each sensor module is assigned a transmitting module configured for transmitting the data determined by the sensor module at least to a further neighboring sensor module or directly to the radio node. With preference, the sensor modules form a multi-hop network. Preferably, the data of the sensor modules are transmitted to the radio module by means of multi-hop routing, in particular by means of multi-stage routing. In particular, each sensor module along a roadway forms a hop of the multi-hop network. Alternatively, however, it is also possible to skip one or more sensor modules during each hop within the multi-hop network. In particular, the transmitting modules each have a significantly lower transmission power than the radio modules. In particular, the transmitting modules each have a transmission power that reaches as far as a next but one transmitting module, preferably at least as far as the next but two transmitting module. As a result, a failure of the nearest transmitting module can advantageously be compensated for. In particular, the transmitting modules each have a transmission power between a few hundred meters and a few kilometers. By way of example, if the sensor modules are arranged at distances of 50 m along the roadway, then the transmission power of the transmitting module is at least 100 mm, preferably at least 200 m. It is conceivable for a diagnosis of the traffic management device, in particular of the sensor network of the traffic management device, to be effected by means of a hop count, i.e. in particular by means of counting the hops until reaching the radio module. If the number of hops decreases, for example, this can mean that a sensor module has failed and was therefore skipped. In particular, at least a portion of the sensor modules can be embodied spatially separately from the radio module. In addition, however, a sensor module can also be arranged at each radio module.

In addition, it is proposed that the sensor module comprises at least one acceleration sensor and/or at least one movement sensor. As a result, a change in position of the sensor module, for example as a result of an accident, or some other event that shifts the sensor module, can advantageously be detected in a simple and/or cost-effective manner. Advantageously, incorrect management of an autonomously driving vehicle guided by the traffic management device can be prevented as a result. Advantageously, high safety can be achieved. In particular, the sensor module, preferably the transmitting module and/or the radio module of the sensor module, can be automatically deactivated upon detection of an acceleration and/or a movement which exceeds vibrations generated in particular by vehicles traveling past or by gusts of wind. In particular, the sensor module is switched off upon recognition of accidents or other events that permanently change the position of the sensor module. In particular, the movement sensor can be embodied as a position sensor, for example a tilt sensor. In particular, the acceleration sensor and/or the movement sensor are/is configured for recognizing movements and/or accelerations that occur during normal operation, for example movements and/or accelerations generated by vehicles traveling past, by wind or by construction work or the like, and for deactivating the sensor module in particular only upon exceedance of said movements and/or accelerations that occur during normal operation. This can be implemented for example by means of a movement and/or acceleration limit value.

If the sensor, in particular the ultra-wideband sensor, is configured for determining a speed of the object moving in the field of view of the sensor and in particular simultaneously in the close range of the sensor, particularly advantageous traffic management by the traffic management device can be made possible. Advantageously, a particularly precise overview of a current traffic situation can be communicated to the receiver. In particular, the speed of the object is determined by way of an evaluation of the reflection signal detected by the receiving unit of the ultra-wideband sensor, in particular on the basis of detected object edges.

Moreover, if the sensor, in particular the ultra-wideband sensor, is configured for determining a direction of movement of the object moving in the field of view of the sensor, particularly advantageous traffic management by the traffic management device can be made possible. Advantageously, wrong-way driver recognition, in particular recognition of a driver driving in the wrong direction, can be made possible as a result. In particular, the direction of movement of the object is determined by way of an evaluation of the reflection signal detected by the receiving unit of the ultra-wideband sensor, in particular on the basis of detected object edges.

If in addition the sensor, in particular the ultra-wideband sensor, is configured for performing a size categorization of the object moving in the field of view of the sensor, particularly advantageous traffic management by the traffic management device can be made possible. Advantageously, a differentiation between pedestrian, car and truck, etc., can be made possible as a result. In particular, for a size categorization of an object, a total length of the object is determined by way of an evaluation of the reflection signal detected by the receiving unit of the ultra-wideband sensor, in particular on the basis of detected object edges. In addition, the sensor, in particular the ultra-wideband sensor, is configured for determining a number of vehicles, preferably a number of vehicles categorized according to size.

Furthermore, it is proposed that the sensor module has at least one further sensor embodied as an ultra-wideband sensor. As a result, even more reliable and/or even safer traffic management can advantageously be made possible. By way of example, as a result, advantageously, a plurality of lanes can be monitored and/or an additional ambient parameter such as a fog density can be determined. In particular, the further sensor is embodied such that it is at least substantially identical to the sensor. However, it is also conceivable for the sensor to operate in the frequency range of between 6 GHz and 8.5 GHz, while the further sensor operates in the frequency range of between 100 MHz and 6 GHz. In this case, it is conceivable, in particular, for the sensor predominantly to be configured for recognition of moving objects in the close range of the sensor, i.e. preferably to be embodied as a close-range radar, while the further sensor is predominantly configured for fog recognition. In particular, a field of view of the further sensor, at least in sections, is free of overlap with the field of view of the sensor. In particular, the field of view of the further sensor is oriented differently with respect to the field of view of the sensor. By way of example, the field of view of the sensor is oriented at least substantially perpendicular to the roadway on which the objects to be monitored are moving, while the further sensor is oriented at least substantially parallel to the roadway on which the objects to be monitored are moving. The expression "substantially perpendicular" is intended here to define in particular an orientation of a direction relative to a reference direction, wherein the direction and the reference direction, in particular as considered in a projection plane, form an angle of 90° and the angle has a maximum deviation of in particular less than 8°, advantageously less than 5° and particularly advantageously less than 2°. "Substantially parallel" should be understood to mean in particular an orientation of a direction relative to a reference direction, in particular in a plane, wherein the direction, in relation to the reference direction, has a deviation of in particular less than 8°, advantageously less than 5° and particularly advantageously less than 2°. In particular, the further sensor is based on an M-sequence technology. In particular, the further sensor emits M-sequence pseudonoise signals. In principle, it is conceivable for the sensor module to comprise additional further sensors, in particular additional further ultra-wideband sensors.

If moreover the traffic management device has a fog recognition reflection element arranged at a defined distance from the further sensor in the field of view of the further sensor, advantageously fog recognition can be made possible and fog data can be communicated to receivers. Advantageously, safety can be increased further as a result. In particular, the fog recognition reflection element is configured for reflecting a signal emitted by the further sensor. In particular, the further sensor is configured for determining presence of fog in the field of view of the further sensor from the received reflection signal of the fog recognition reflection element. In particular, the defined distance from the further sensor is a few meters, in particular at least 1 m, with preference at least 2 m, preferably at least 5 m, more preferably at least 10 m and particularly preferably at most 20 m. By way of example, the fog recognition reflection element can be integrated in a roadway boundary or be secured to the roadway boundary. In particular, the fog recognition reflection element is embodied as a sheet or plate having a flat, in particular planar, surface. In particular, the fog recognition reflection element is arranged outside the field of view of the sensor.

If in addition the sensor module comprises at least one ambient condition sensor, in particular a temperature sensor and/or an air humidity sensor, particularly reliable fog recognition can advantageously be made possible. Advantageously, recognition of a fog density can be made possible. Moreover, awareness of a possible slippery road surface and/or road wetness can advantageously be obtained. In particular, the radio module is configured for emitting to the receivers measurement data of the ambient condition sensor, in particular temperature measurement data and/or air humidity measurement data. As a result, advantageously, weather conditions can be taken into account in the control of the at least partially and/or at least time-segment-wise self-driving vehicles, as a result of which in particular safety of the traffic management can be increased further. By way of example, the receiver vehicle may know in advance about a roadway location, e.g. a windy steel bridge or a wind corridor, which might be icy or might be covered by a snow drift. Alternatively or additionally, it is conceivable for the sensor module to have a further wind sensor, which can preferably be installed at wind corridors or on bridges. As a result, advantageously, safety can be increased further, for example by virtue of the possibility of warning against hazardous wind situations.

In addition, it is proposed that the sensor module is configured for determining a fog density, in particular on the basis of a combination of a signal generated by the fog recognition reflection element in the further sensor with data of the ambient condition sensor. As a result, advantageously, safety of the traffic management can be increased further. In particular, the sensor module comprises a computing unit configured for correspondingly processing and/or conditioning sensor data of the sensors. A "computing unit" should be understood to mean in particular a unit having an information input, information processing and an information output. Advantageously, the computing unit has at least one processor, a memory, input and output means, further electrical components, an operating program, closed-loop control routines, open-loop control routines and/or calculation routines. Preferably, the components of the computing unit are arranged on a common circuit board.

Furthermore, it is proposed that the sensor module comprises at least one slippery road surface sensor. As a result, advantageously, safety of the traffic management can be increased further. In particular, the slippery road surface sensor, preferably at least one temperature probe of the slippery road surface sensor, is arranged at least partially in proximity to the ground and/or in contact with the ground relative to the roadway. Preferably, the slippery road surface sensor is connected to the sensor module wirelessly or in a wired manner. In particular, the radio module is configured for emitting measurement data of the slippery road surface sensor to the receivers. In particular, the slippery road surface sensor is at least partially integrated in the roadway boundary, for example in the guard rail or in the guide post. In particular, the slippery road surface sensor can be embodied as a temperature and/or moisture sensor which determines a slippery road surface, in particular a probability of a slippery road surface, for example by means of a correlation of data of the temperatures near the ground and the moisture (determined by the slippery road surface sensor or by the ambient condition sensor of the sensor module). As an alternative to a temperature probe, the slippery road surface sensor can also have an infrared detector for measuring the temperature of a roadway.

In addition, in this context, it is conceivable for the weather data determined (by means of the ambient condition sensor), such as temperature, air humidity, slippery road surface, fog density, etc., to be retrievable externally, e.g. for a road maintenance agency. In this case, it is conceivable for the data to be collected in a central database that can be made accessible for a user in return for a monetary consideration. Alternatively, direct interrogation of databases of the individual sensor modules independently of a central database is also conceivable. In particular, in this case, a partial section concerning which data are intended to be retrieved is flexibly selectable by the user. Occurrence of e.g. fog (or else aquaplaning, or the like) may often be very locally delimited and is therefore often predictable only with difficulty by means of large-area weather models. A fog warning, e.g. by way of a fog display, based on locally measured data, is therefore far more effective and more precise than one based on large-area weather models. For example, in the area of interstate highway bridges that pass over rivers, there is an increased probability of occurrence of fog, and so switchable fog warning signal displays are often provided at these danger spots. An operator can advantageously flexibly select the areas in which such switchable fog warning signal displays are present, and can request up to date weather data, in particular fog density data, etc., from the database or from the sensor modules directly. Advantageously, in this case, a particularly exact monetary consideration, dependent in particular on the scope and extent of the requested data (route length, data type, etc.), can be calculated and payment can be demanded for this. In particular, the exactly calculated amount due can be debited to a cryptowallet of the user, e.g. in a cryptocurrency, such as e.g. IOTA, which requires particularly low or ideally no transaction fees. By way of example, a user or an operator who is responsible for a route section with fog warning signal displays is shown a map excerpt of the route displayed on an app. The user selects a portion of the displayed route that is relevant to said user by means of a gesture or by means of a mouse movement. This can be effected for example in the form of a so-called shift register. Moreover, the user in this example selects a time period for which the user would like to retrieve data about the selected portion of the displayed route. The sensor modules situated on the selected route portion then supply the user with the data for the defined time period for a fixed price, which in particular is automatically debitable to a cryptowallet of the user. It is thus advantageously possible to interrogate the sensor modules section by section by way of maps by means of mouse movement or by means of finger gesture, to define the time and to carry out the payments in an automated manner. Alternatively or additionally, it is conceivable for traffic signal displays, e.g. the fog warning signal displays, to receive information preferably configured for controlling the display signal directly from sensor modules positioned in the vicinity of the traffic signal displays along the traffic route and to control the representation of the display signal automatically on the basis thereof.

Furthermore, it is proposed that the sensor module comprises at least one position recognition sensor, in particular a GPS sensor, a Galileo sensor, a GLONASS sensor and/or a Beidou sensor. As a result, manual calibration can advantageously be dispensed with. Advantageously, installation of the traffic management device can be simplified. In particular, the position recognition sensor is configured for recognizing a degree of longitude, a degree of latitude and/or an altitude, in particular an altitude referenced to a sea level. Alternatively, however, it is also conceivable for the traffic management device to be free of position recognition sensors and for the sensor modules to be exactly calibrated by mounting personnel during installation. Preferably, sensor modules fixedly incorporated in a nonmovable infrastructure are free of a position recognition sensor. By way of example, it is conceivable for the mounting personnel to acquire a mounting device which is designed specifically for this purpose and which, during mounting, determines a millimeter-accurate position signal, for example a GPS signal, and transfers it to the sensor module or a computing unit of the sensor module. Upon obtaining the position data, the sensor module or the radio module assigned to the sensor module preferably begins to emit the transferred position data. By means of an additional output of the altitude besides the degrees of longitude and latitude, an excessively high vehicle, for example a truck or a ship, could advantageously be prevented from passing through a low bridge.

In addition, it is proposed that the traffic management device, in particular the sensor module and/or the radio module, preferably each sensor module and/or each radio module, has an energy harvesting unit for the energy supply of at least the respective sensor module and/or radio module. A high energy efficiency can advantageously be achieved as a result. Ideally, independence from an external power supply via an electricity grid and/or from a battery power supply can be achieved as a result. Advantageously, however, in any case a power consumption from the electricity grid can be decreased and/or a battery lifetime can be increased. In particular, the energy harvesting unit is configured for generating energy from the environment, for example by means of photovoltaics, by means of a wind generator and/or by means of piezoelectric crystals from (air) pressures and/or vibrations generated by passing traffic. In particular, the energy harvesting unit is configured for providing a charging current for a rechargeable battery, in particular at least for a rechargeable battery of the sensor module and/or of the radio module. Alternatively, a power supply without energy harvesting is conceivable, for example via a (public) electricity grid or a battery/the rechargeable battery.

If the energy harvesting unit comprises at least one wind generator, energy can advantageously be obtained from an airflow of passing vehicles. In particular by virtue of the small distances made possible by the use of the ultra-wideband sensors, a particularly effective use of the airflow of passing vehicles for energy harvesting can advantageously be made possible. Furthermore, it is proposed that the traffic management device has an opaque and/or hermetically closed, in particular hermetically encapsulated, housing unit, which in particular surrounds at least the sensor module and/or the radio module. As a result, high robustness of the traffic management device can advantageously be achieved. Advantageously, damage, for example as a result of dirt, moisture, UV radiation and/or stone chipping, can be avoided. In particular, the housing unit of the traffic management device is free of a sensor opening, a sensor lens or the like. In particular, the covering of the ultra-wideband sensor by the housing unit does not adversely affect the functionality of the ultra-wideband sensor to a significant extent. In particular, apart from one or more probes of the ambient condition sensor and/or apart from one or more cable bushings, the housing unit completely encloses the sensor module and/or the radio module. In particular, the housing unit is watertight. In particular, the housing unit is nontransparent, at least to UV rays and/or visible light. Advantageously, the ultra-wideband sensor remains fully functional even when covered by a foreign body, for example by a layer of dirt, a layer of mud, a layer of snow, a layer of foliage and/or a layer of ice. This is particularly advantageous in comparison with known radar or lidar sensors, which may fail when covered by snow, foliage or the like. It is conceivable for the sensor module, in particular the transmitting unit of the sensor module and/or the radio module, to be configured for emitting a cleaning signal. By way of example, by means of the sensor signal of the ultra-wideband sensor, it is possible to estimate a level of soiling and/or covering by foreign bodies, for example by way of a change in the reflection signal strength, the emission of the cleaning signal being triggered when a limit value, in particular a soiling limit value and/or a covering limit value, is exceeded. Said cleaning signal can advantageously be received by a maintenance vehicle moving along the roadway, with the result that targeted cleaning can take place. Advantageously, cleaning is able to be carried out by means of a standard brush-type vehicle of a road maintenance agency.

Furthermore, it is proposed that the sensor module has, in addition to the ultra-wideband sensor, at least one camera configured for recognizing at least one object moving in a field of view of the camera. As a result, a blind spot between the fields of view of the ultra-wideband sensors can advantageously be reduced. In addition, recognition of animals or humans on the roadway would advantageously be possible by way of the camera. The field of view of the camera can be embodied in particular in such a way that possible blind spots of the ultra-wideband sensors are covered as completely as possible by the field of view of the camera. The camera is advantageously embodied as an optical camera having a detection range in the visible spectrum, coverage of at least a portion of the infrared spectrum and/or of the UV spectrum alternatively or additionally also being conceivable.

In addition, it is proposed that the camera is embodied as a classification camera configured for classifying the recognized objects in a plurality of different, for example at least three, at least four or at least eight, vehicle classes. As a result, a particularly reliable vehicle classification, for example for carrying out traffic counts, can advantageously be performed. In particular, the camera is configured for carrying out the vehicle classification internally. In particular, the camera is configured for storing determined vehicle classifications in an internal storage module. In particular, the camera is configured for emitting determined vehicle classifications via the radio module to at least one receiver, for example a readout vehicle or an external data collection center. In particular, the camera complies with the General Data Protection Regulation (GDPR). In particular, the camera does not transmit any images, but rather only information about the captured classification categories (e.g. a classification code), to the receiver. In particular, the camera does not store any captured images. In particular, after a vehicle classification has taken place, the camera erases the image material used for this. In particular, the vehicle classification takes place in real time on the basis of currently recorded camera images.

Moreover, it is proposed that the classification of objects, in particular vehicle classification of vehicles, that is performed by the camera is configured at least for training and/or for supervision of a classification of the objects, in particular the vehicles, that is performed, in particular in parallel by the ultra-wideband sensor. As a result a hit accuracy of a vehicle classification can advantageously be improved. As a result, a UWB classification of vehicles can advantageously be improved. In particular, a comparison of the vehicle classification of a detected vehicle that is performed by the ultra-wideband sensor with the vehicle classification of the detected vehicle that is performed by the classification camera takes place internally in the sensor module.

Furthermore, a traffic management system, in particular a stationary traffic management system, preferably for managing at least partially and/or at least time-segment-wise self-driving vehicles, comprising the traffic management device is proposed, wherein the traffic management device has at least one or a plurality of sensor modules, each having at least one sensor configured for sensing at least one item of information and/or at least one parameter of at least one object moving in a field of view of the sensor, and comprising at least one or a plurality of roadway boundary elements, forming at least a portion of a roadway boundary, for example at least one guard rail, at least one guide post, at least one railroad crossing gate and/or at least one warning beacon, wherein the sensor module/s forms/form at least one further part of the roadway boundary and/or wherein the sensor module/s is/are at least partially integrated in the roadway boundary element. In particular, as a result, it is advantageously possible to achieve a relocation of at least a portion of a sensor system for autonomous driving into an infrastructure, as a result of which in particular a significant reduction of the production costs of the autonomous vehicles can be achieved since advantageously, not every vehicle then need be equipped with its own complicated sensor system. Moreover, advantageously, maintenance of the safety-relevant sensor system can be facilitated and better supervised if the latter is introduced into an infrastructure, administered in particular by a traffic authority, rather than in the vehicles of private persons and companies. The fact that sensor modules "form a portion of the roadway boundary" should be understood to mean in particular that a multiplicity of sensor modules are arranged along the roadway on at least one side of the roadway, preferably on both sides of the roadway, and thus delimit a roadway at least on the side, preferably on both the sides. The fact that a sensor module "is integrated in a roadway boundary element" should be understood to mean in particular that the sensor module is fixedly mounted on the roadway boundary element or is surrounded by the roadway boundary element preferably at least partially or at least to the extent of a large portion. A "large portion" should be understood to mean in particular at least 51%, with preference at least 66%, preferably at least 80% and particularly preferably at least 95%.

In addition, it is conceivable for the traffic management device to have one or a plurality of radio modules which is/are configured at least for emitting data, in particular position and/or speed data, based at least on the sensed information and/or the sensed parameter of the at least one movable object, to at least one receiver, in particular at least to the at least partially and/or at least time-segment-wise self-driving vehicle, wherein the radio module/s forms/form at least one further portion of the roadway boundary and/or wherein the radio module/s is/are at least partially integrated in the roadway boundary element.

In particular, a radio module together with a sensor module, for example with a common housing unit, can form the further portion of the roadway boundary and/or can be at least partially integrated in the roadway boundary element or separately from sensor modules, for example with a dedicated housing unit, can form the further portion of the roadway boundary and/or can be at least partially integrated in the roadway boundary element.

In particular, the sensor module/s and/or the radio module/s can also be arranged behind the roadway boundary element/s as viewed from the roadway. As a result, protection of the sensor modules and/or of the radio modules, for example against stone chipping, against dust or against spray water, can advantageously be increased. In addition, as a result, the sensor modules and/or the radio modules are advantageously not directly visible from a vehicle situated on the roadway.

If at least the sensor module/s is/are arranged in a close range of a roadway edge, reliable and safe traffic management can advantageously be made possible even under particularly confined conditions in which little structural space is available for sensor positioning, such as, for example, on a construction site bypass, in a multistorey carpark, at a filling station, on a ferry, etc. A "close range" should, in this context, be understood to mean in particular a range formed from points that are at a distance from the roadway edge, which is at most 0.5 m, with preference at most 0.3 m, advantageously at most 0.2 m, preferably at most 0.1 m and particularly preferably at most 0.05 m. In this case, a "roadway edge" should be understood to mean in particular a lateral boundary line of the roadway and a vertical extension thereof, the vertical extension forming an imaginary vertical wall that laterally delimits the roadway.

If, in addition, at least one roadway boundary element in which a sensor module is integrated is embodied as a movable construction site barrier element, for example a warning beacon, a pylon, an advance warning trailer of a road patrol, a concrete safety barrier, a direction stripe separator or the like, particularly safe traffic management in narrow construction site areas can advantageously be made possible. Moreover, simple construction site set-up can advantageously be made possible.

It is additionally proposed that at least the sensor modules are arranged on both sides of a roadway, in particular in a manner offset with respect to one another. As a result, particularly accurate traffic management can advantageously be achieved.

Moreover, it is proposed that the traffic management system is configured for managing road traffic, railroad traffic and/or aircraft taxiing traffic. As a result, a particularly high flexibility of use can be achieved. In particular, the traffic management system is particularly advantageous in all conceivable cases in which objects have to move at high speeds (>20 km/h) closely past boundaries and/or other objects (further examples: ambulance in a rescue lane, subway in a subway tunnel, conveying and/or transport vehicles in a mine).

Furthermore, a retrofittable receiving module is proposed which is configured for receiving data of the traffic management device and/or of the traffic management system, for evaluating said data and for outputting them to a driver of a driver-controlled vehicle by means of an information output device. As a result, effective traffic management of fully driver-controlled, in particular non-autonomously driving, vehicles can advantageously be made possible as well.

In particular, the receiving module is configured for outputting information about traffic ahead and/or action instructions and/or action proposals graphically and/or acoustically to the driver of the driver-controlled vehicle. By way of example, the retrofittable receiving module can be coupled to a display of the driver-controlled vehicle, for example a dashboard display, such as a screen arranged in or on the dashboard, to a mobile device of the driver, for example a smartphone or a navigation device, to a loudspeaker system of the driver-controlled vehicle or to a head-up display of the driver-controlled vehicle. Moreover, a traffic information system comprising the traffic management system and comprising the retrofittable receiving module is proposed. In particular, advantageous traffic management can be achieved as a result.

Furthermore, what is proposed is a method for managing traffic by means of a, in particular stationary, traffic management device, in particular for managing at least partially and/or at least time-segment-wise self-driving vehicles, comprising at least one detection step, in which at least one item of information and/or at least one parameter of at least one object moving in a field of view of a sensor are/is sensed, and comprising at least one traffic management step, in which data based at least on the sensed information and/or at least on the sensed parameter of the at least one movable object are emitted to a receiver, in particular to an at least partially and/or at least time-segment-wise self-driving vehicle, wherein the information and/or the parameter are/is sensed by a sensor embodied as an ultra-wideband sensor, which sensor is preferably based on an M-sequence technology and/or emits M-sequence signals in the detection step. As a result, in particular even at high speeds (e.g. >20 km/h) and under confined space conditions (e.g. distances of less than 0.2 m), reliable and/or safe traffic management can advantageously be made possible. Advantageously, reliable and/or certain recognition of vehicles and/or speeds of vehicles in a close range of the sensor can be made possible. In particular, preferably automated, traffic guidance at roadway bottlenecks can advantageously be made possible as a result.

Moreover, it is conceivable for the traffic management system to have at least a majority of sensor modules whose radio modules are additionally provided to enable vehicles, in particular uniquely identifiable vehicles, to log on and/or off in the traffic management system by means of exchanging data signals. Preferably, the logging on and/or off of the vehicles, in particular the exchange of data signals between the vehicles and the sensor modules, is effected by means of a wireless interface, for example by means of a Bluetooth low energy interface, by means of a 5G interface or by means of an IEEE 802.11p interface. In particular, it is conceivable here that, per access road/per exit road to a traffic route, e.g. to an interstate highway, only one or a plurality of sensor modules of the traffic management system that are arranged in the close range of the access road/the exit road have the interface for the exchange of data signals for logging vehicles on and/or off, while in particular sensor modules arranged outside the close ranges of access roads or exit roads are free of the interface for the exchange of data signals for logging vehicles on and/or off. In this context, a "close range" of an access road/an exit road should be understood to mean a range of a few 100 meters around an access road/an exit road of the traffic route (e.g. 300 m or 500 m). As a result, in addition, a precise and uncomplicated route-dependent traffic toll calculation (for trucks and/or for cars) can advantageously be made possible. In particular, it is conceivable here that at least one vehicle (viable to pay a toll) is assigned a cryptowallet (for example a cryptowallet of a driver of the vehicle) and, upon leaving the traffic route, the exactly calculated traffic toll is automatically debited to the cryptowallet assigned to the vehicle, e.g. in a cryptocurrency, such as e.g. IOTA, which requires particularly low or ideally no transaction fees. Advantageously, cumbersome permit stickers or the like can be replaced by the proposed system. Already existing toll systems, too, e.g. with bookable routes or weekly tickets, as is the case in Austria, for example, can easily be implemented with the proposed system. In this case, booking could be effected by means of a smartphone app, for example, via which the communication with the sensor modules then also takes place during the journey, i.e. e.g. the route or time period comparison with the paid booking. Advantageously, it is possible to avoid waiting times that currently arise e.g. as a result of bridge or tunnel fees or as a result of the toll stations dividing up the interstate highway routes, such as exist in Italy or Croatia, inter alia.

In this case, the traffic management device according to the invention, the traffic management system according to the invention, the traffic information system according to the invention, the retrofittable receiving module according to the invention and the method according to the invention are not intended to be restricted to the application and embodiment described above. In particular, the traffic management device according to the invention, the traffic management system according to the invention, the traffic information system according to the invention, the retrofittable receiving module according to the invention and the method according to the invention, in order to fulfil a mode of functioning described herein, can have a number deviating from a number of individual elements, components, method steps and units mentioned herein.

DRAWINGS

Further advantages will become apparent from the following description of the drawings. Eight exemplary embodiments of the invention are illustrated in the drawings. The drawings, the description and the claims contain numerous features in combination. The person skilled in the art will expediently also consider the features individually and combine them to form expedient further combinations.

Figure 2:
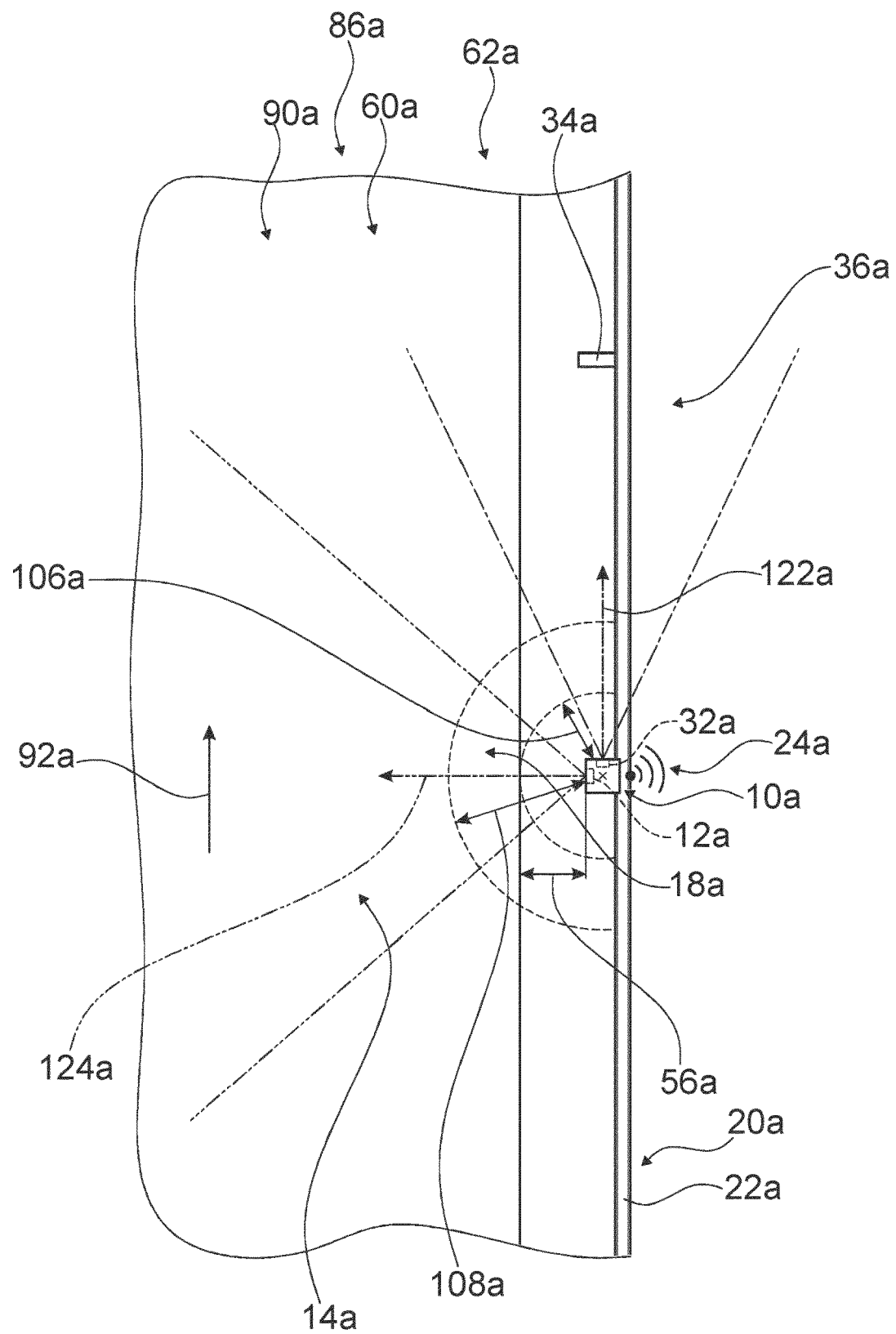
Figure 3:
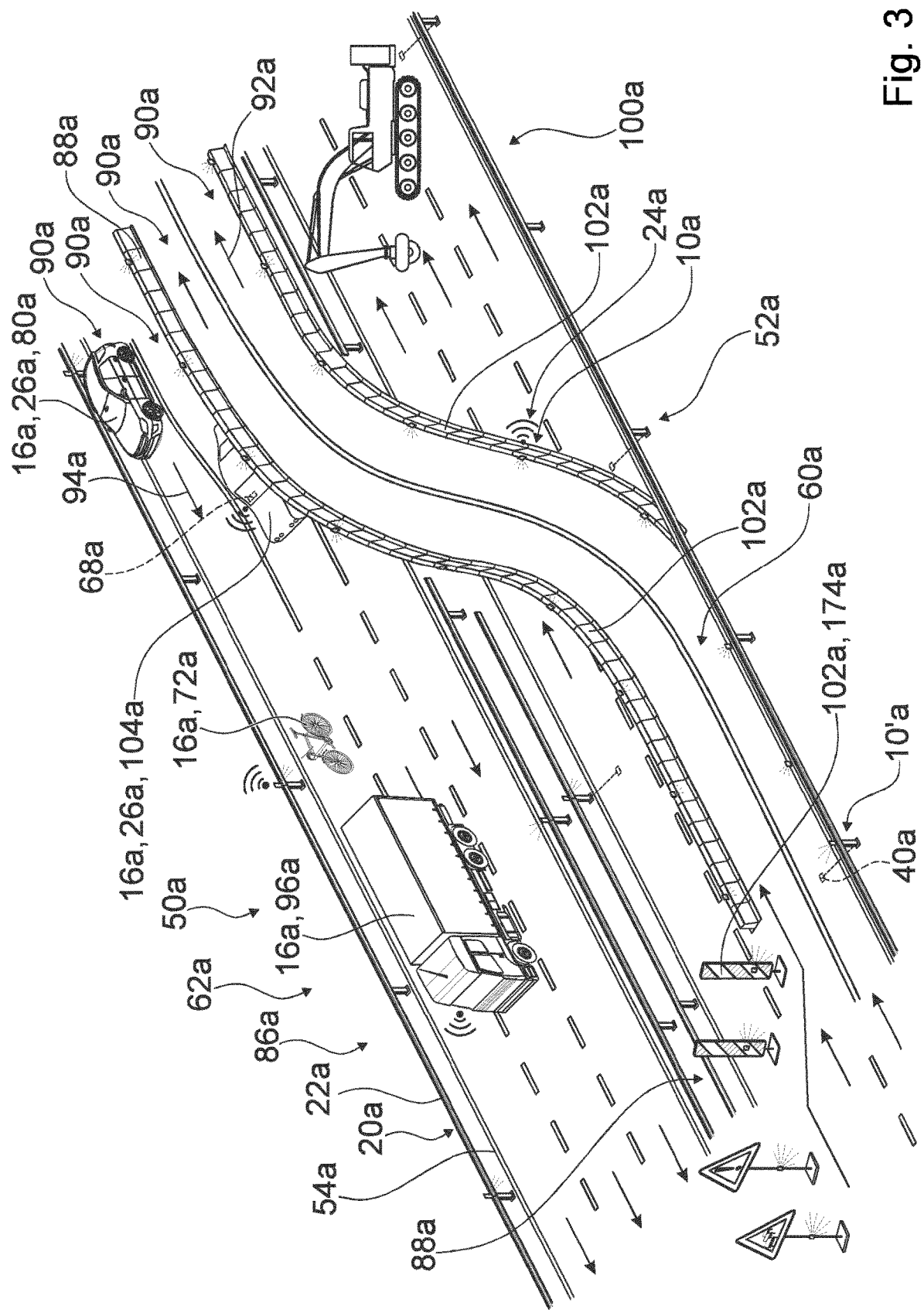
Figure 4:
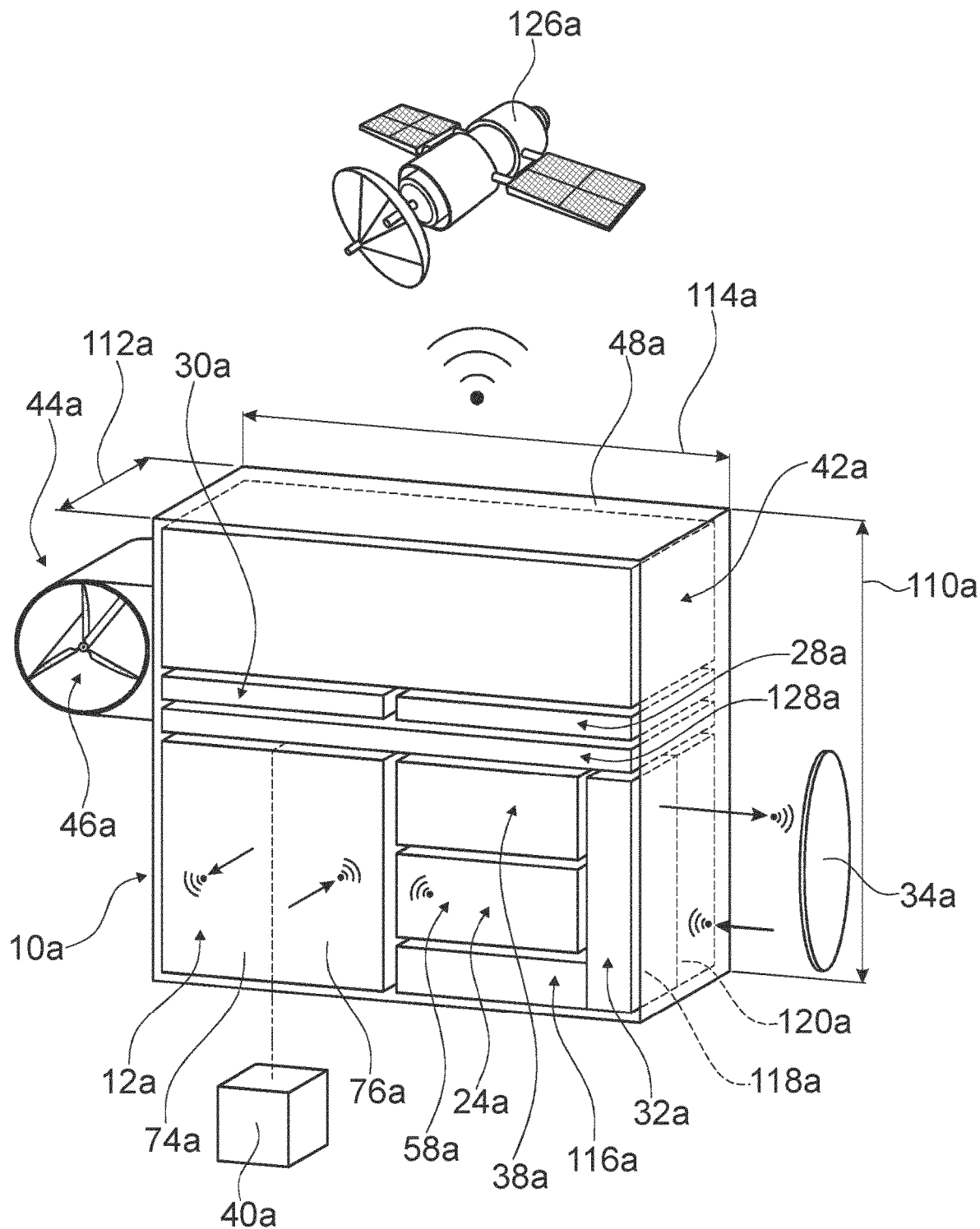
Figure 5:
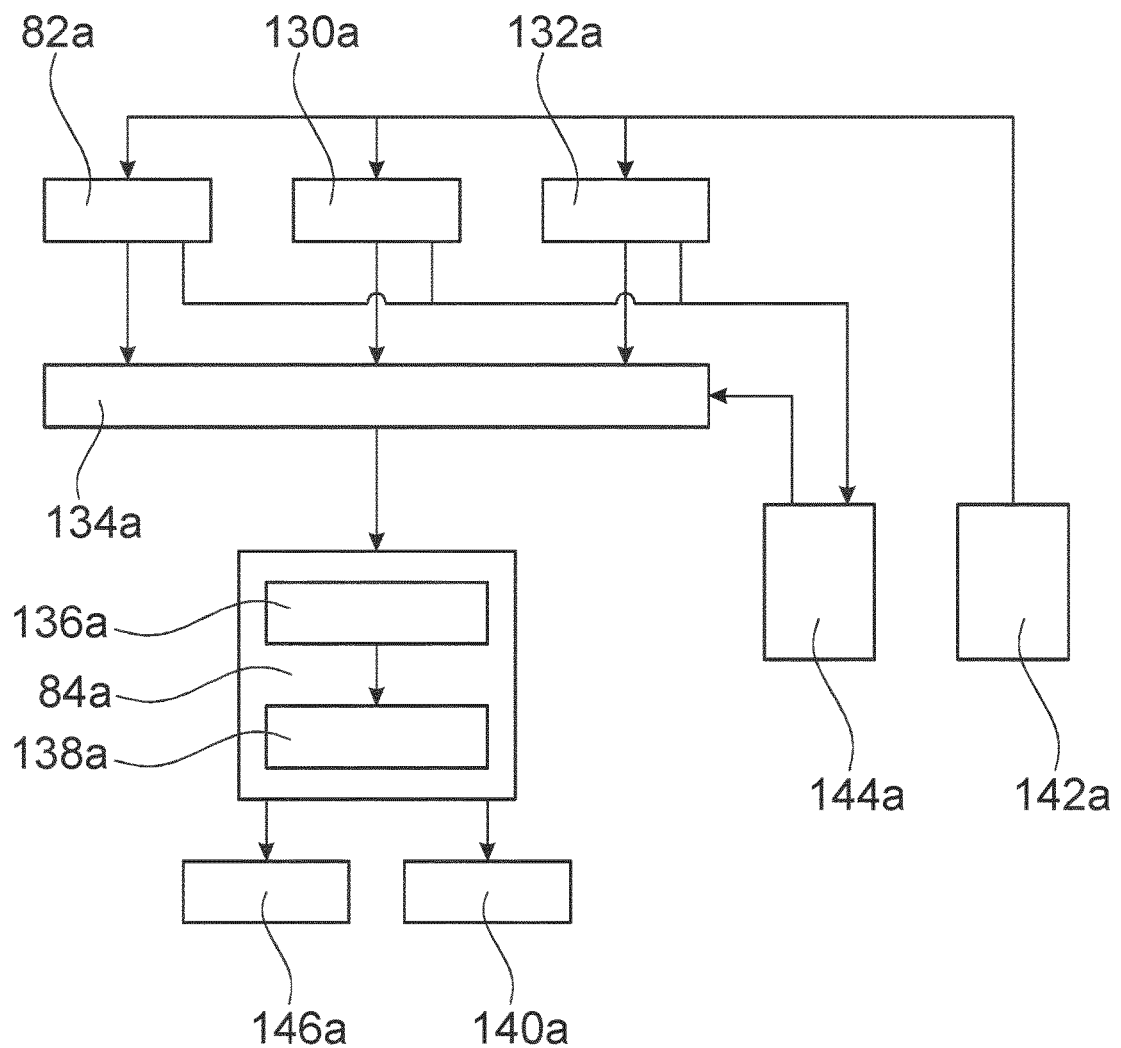
Figure 6:
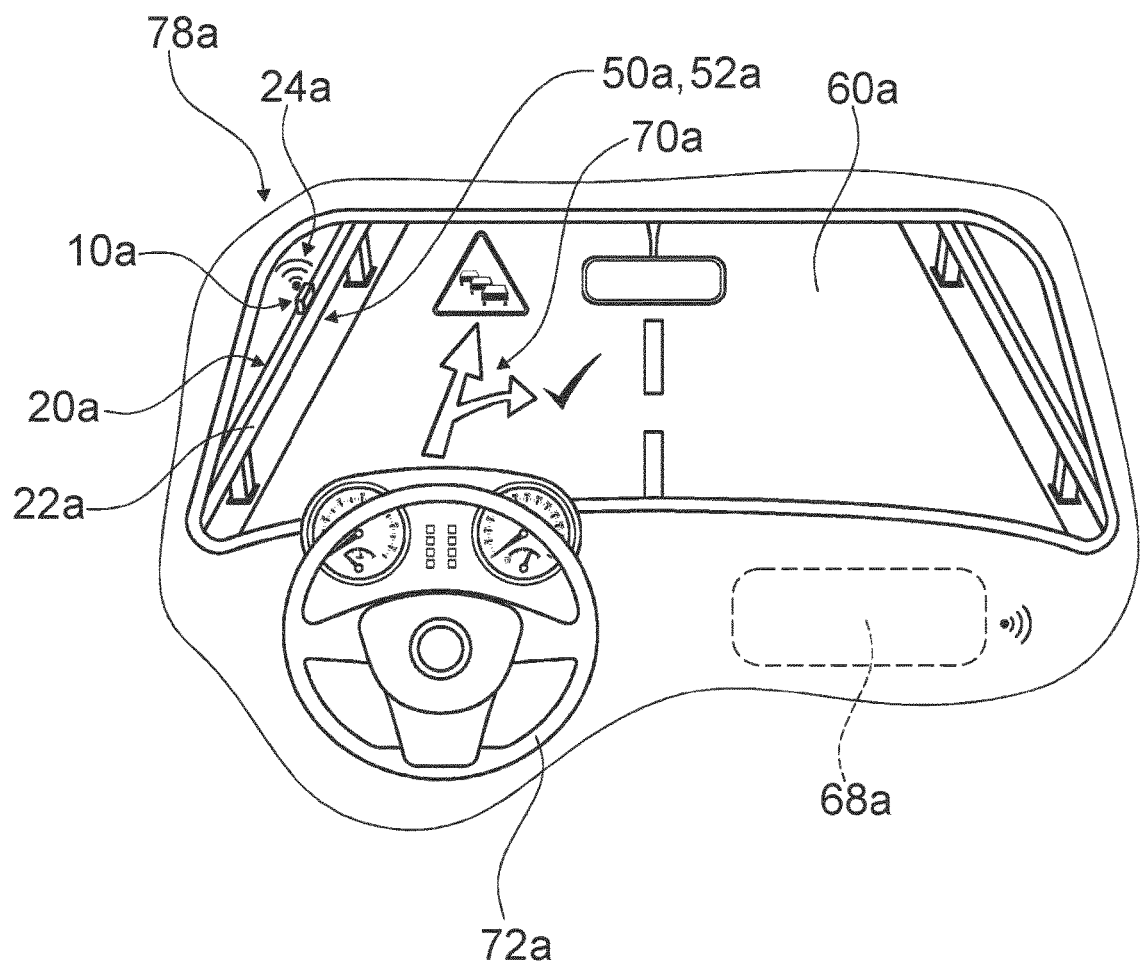
Figure 7:
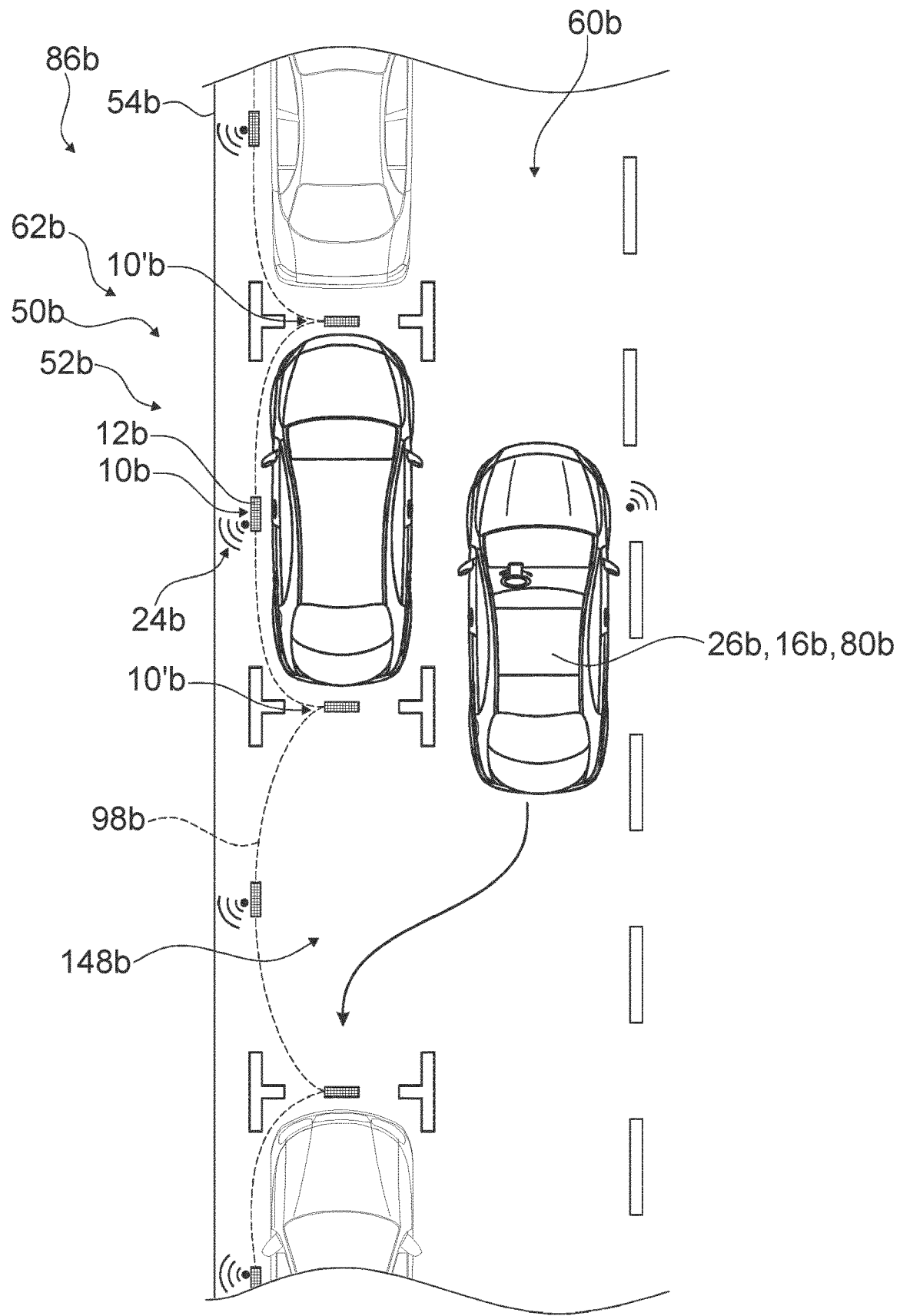
Figure 8:
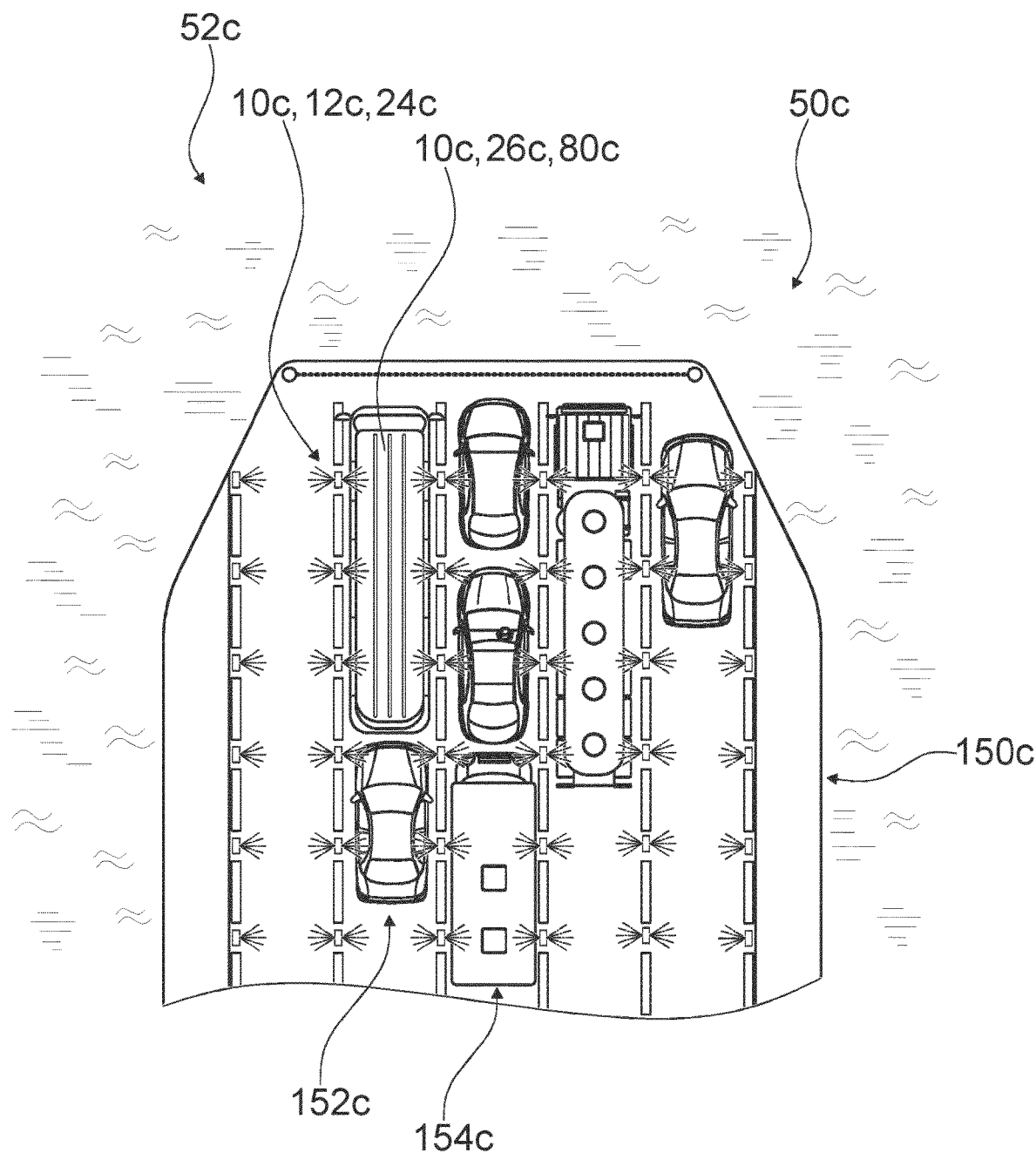
Figure 9:
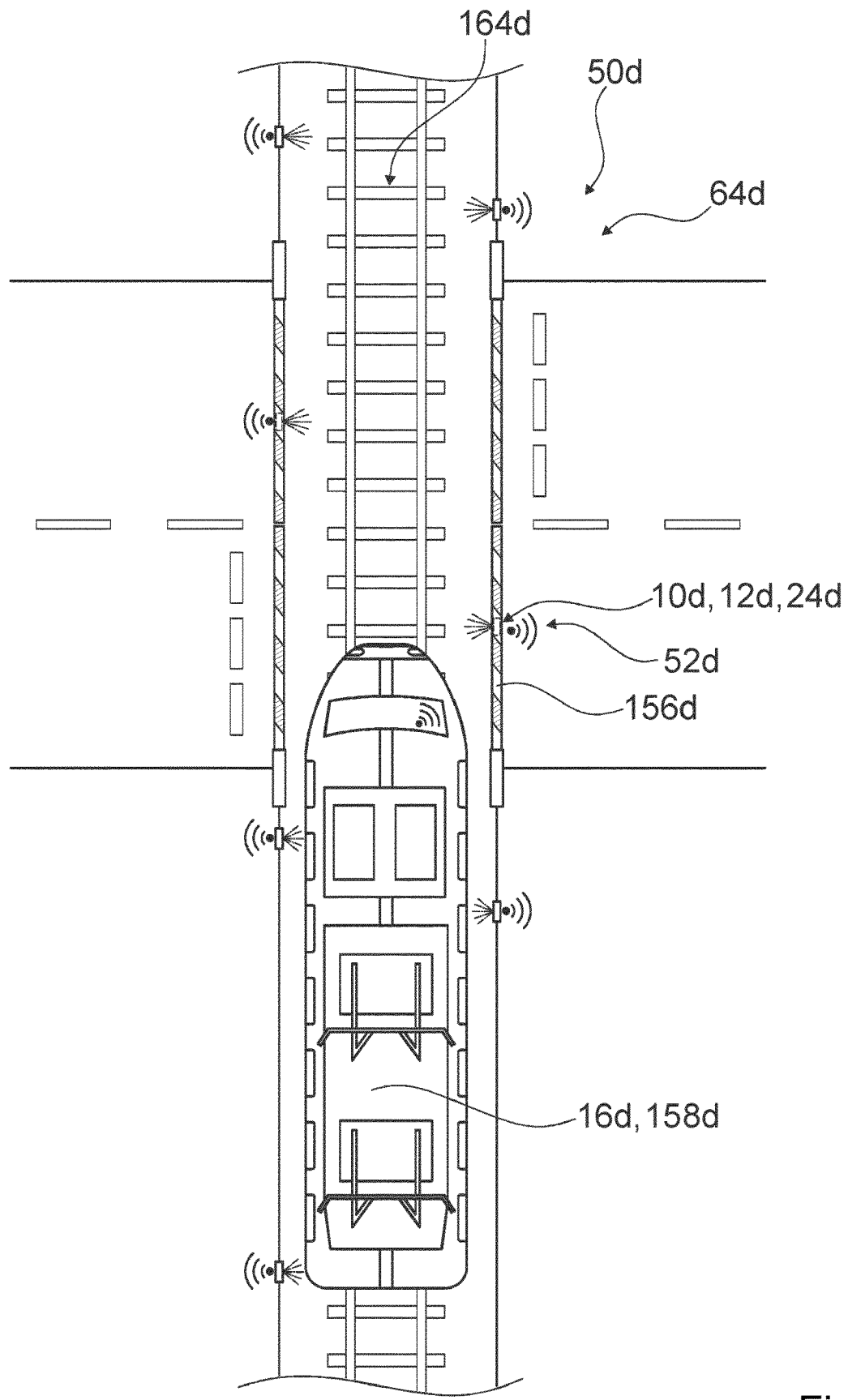
Figure 10:
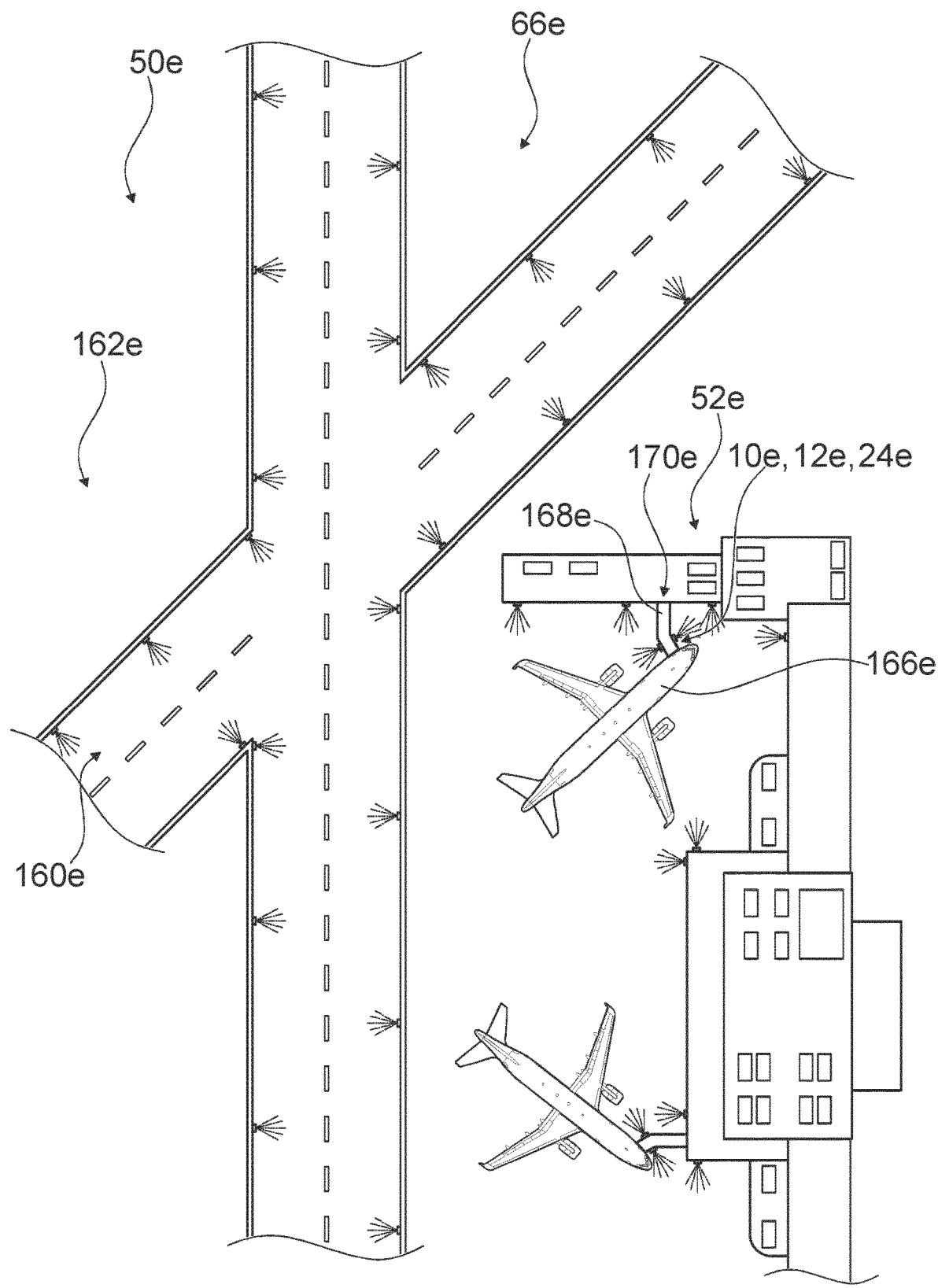
Figure 11:
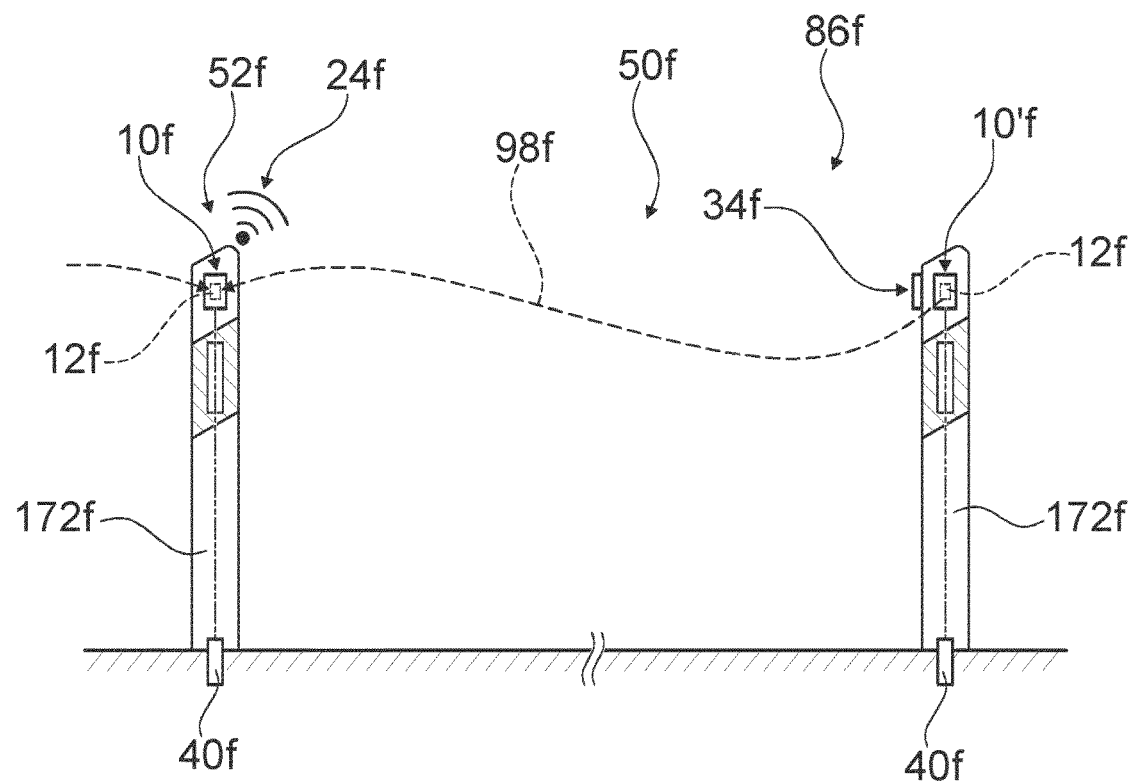
Figure 12:
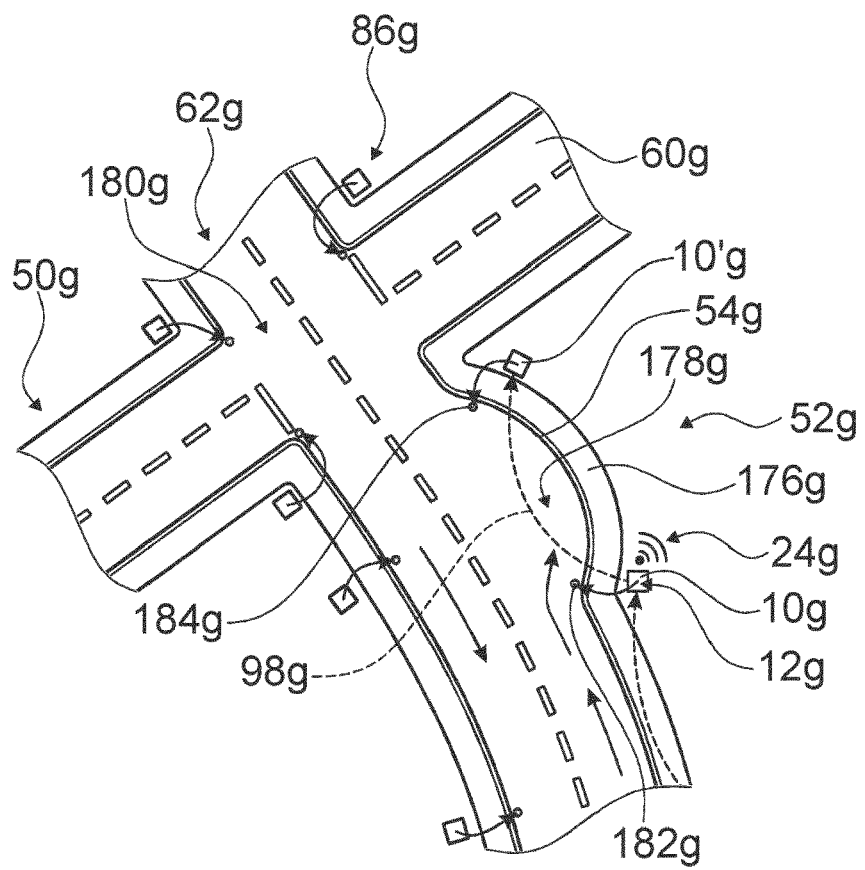
Figure 13:
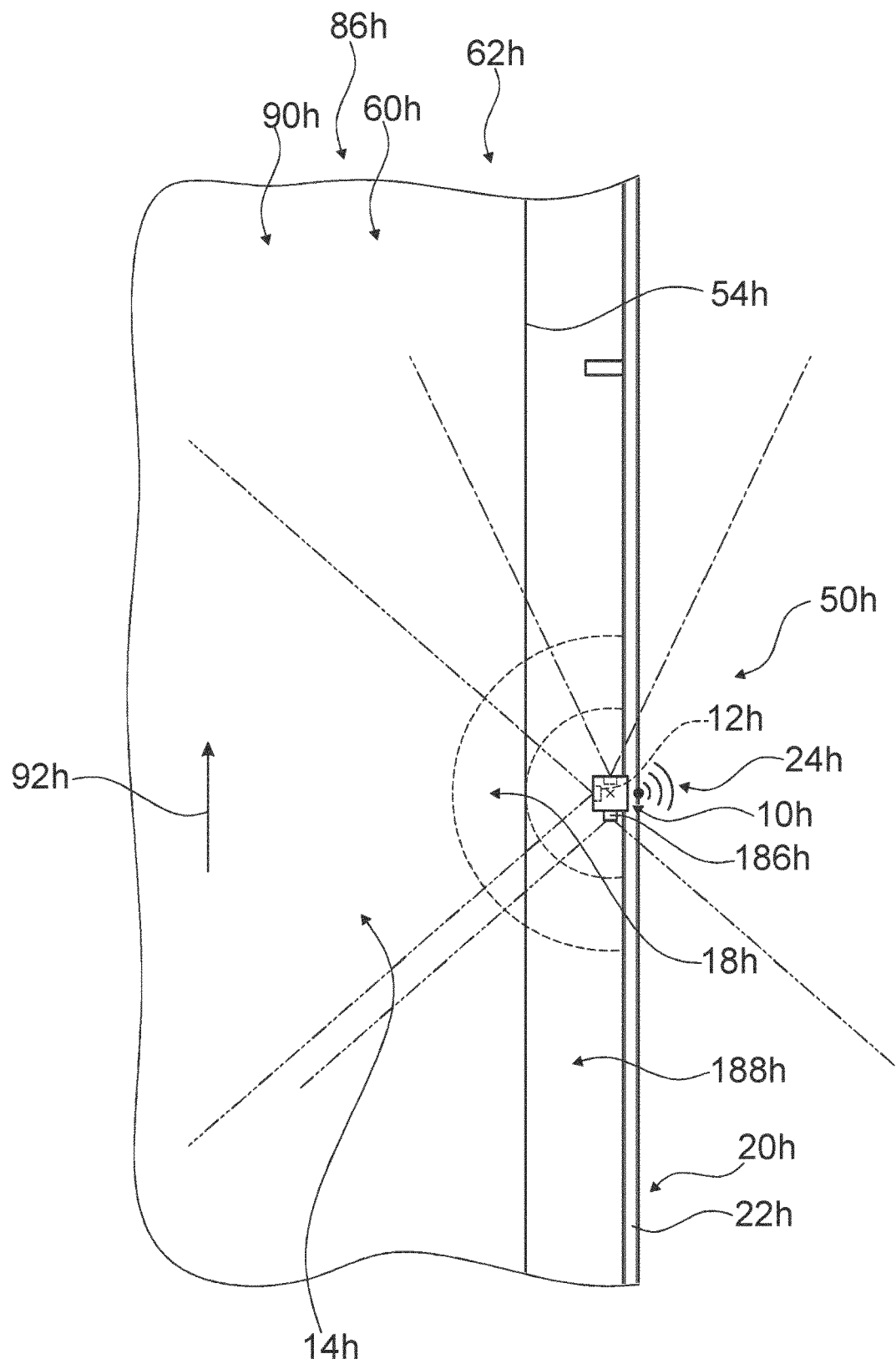

In the drawings:

FIG. 1 shows a schematic illustration of a detail of an infrastructure comprising a traffic management system, FIG. 2 shows a schematic plan view of a portion of the traffic management system comprising a traffic management device, FIG. 3 shows a schematic illustration of a further detail of the infrastructure comprising the traffic management system in the region of a bottleneck, FIG. 4 shows a schematic illustration of a portion of the traffic management device comprising a sensor module and comprising a radio module, FIG. 5 shows a schematic flow diagram of a method for managing traffic, FIG. 6 shows a schematic illustration of a traffic information system comprising the traffic management system and comprising a retrofittable receiving module, FIG. 7 shows an alternative traffic management system, FIG. 8 shows a second alternative traffic management system, FIG. 9 shows a third alternative traffic management system, FIG. 10 shows a fourth alternative traffic management system, FIG. 11 shows a fifth alternative traffic management system, FIG. 12 shows a sixth alternative traffic management system, and FIG. 13 shows a seventh alternative traffic management system.

DESCRIPTION OF EXEMPLARY EMBODIMENTS

FIG. 1 shows a detail of an infrastructure 86$a$ comprising a traffic management system 50$a$ for managing road traffic 62$a$. The traffic management system 50$a$ is embodied as a stationary traffic management system. The traffic management system 50$a$ is partially integrated in the infrastructure 86$a$. The infrastructure 86$a$ comprises a roadway 60$a$. In the case illustrated by way of example, the roadway 60$a$ is embodied with six lanes. In the case illustrated by way of example, the roadway 60$a$ has a structural separation 88$a$ of lanes 90$a$ of different travel directions 92$a$, 94$a$. The infrastructure 86$a$ has a roadway boundary 20$a$. As viewed from the roadway 60$a$, the roadway boundary 20$a$ is arranged behind a roadway edge 54$a$ of the roadway 60$a$. The roadway boundary 20$a$ comprises roadway boundary elements 22$a$. In the case illustrated in FIG. 1, the roadway boundary elements 22$a$ are embodied as guard rails. In the case illustrated in FIG. 1, the lanes 90$a$ of a travel direction 92$a$, 94$a$ are bordered on both sides by roadway boundaries 20$a$ having roadway boundary elements 22$a$, in particular guard rails.

The traffic management system 50$a$ is configured for managing at least partially and/or at least time-segment-wise self-driving vehicles 80$a$, 96$a$. The traffic management system 50$a$ has a traffic management device 52$a$. The traffic management device 52$a$ has sensor modules 10$a$, 10'$a$. The sensor modules 10$a$, 10'$a$ are configured for sensing at least one item of information and/or at least one parameter of at least one self-driving vehicle 80$a$, 96$a$ and/or of at least one driver-controlled vehicle 72$a$. The sensor modules 10$a$, 10'$a$ form a portion of the roadway boundary 20$a$. The sensor modules 10$a$, 10'$a$ are each dimensioned in such a way that they are able to be integrated in the roadway boundary 20$a$, in particular into the roadway boundary elements 22$a$. In the exemplary case illustrated in FIG. 1, the sensor modules 10$a$, 10'$a$ are partially integrated in roadway boundary elements 22$a$. In the exemplary case illustrated in FIG. 1, the sensor modules 10$a$, 10'$a$ are secured to the roadway boundary elements 22$a$. Alternatively, however, the sensor modules 10$a$, 10'$a$ can also be arranged separately from the roadway boundary elements 22$a$, for example behind the roadway boundary elements 22$a$. The sensor modules 10$a$, 10'$a$ are arranged on both sides of the roadway 60$a$, in particular on both sides of the lanes 90$a$ of each travel direction 92$a$, 94$a$ of the roadway 60$a$. The sensor modules 10$a$, 10'$a$ on one side of the roadway 60$a$ are installed at distances from one another of in each case approximately 50 m.

The traffic management device 52a has radio modules 24a. The radio modules 24a are configured for emitting data, in particular position and/or speed data, of the vehicles 72a, 80a, 96a registered by the sensor modules 10a, 10'a to at least one receiver 26a, for example to the self-driving vehicle 80a or to a further at least partially and/or at least time-segment-wise self-driving vehicle 96a. The radio modules 24a are configured for emitting permanently and/or continuously repeatedly exact position data of the radio module 24a and/or the sensor modules 10a, 10'a. Data emitted by the radio module 24a are encrypted by means of a blockchain technology or a digital ledger technology (DLT). The radio modules 24a form a portion of the roadway boundary 20a. The radio modules 24a are each dimensioned in such a way that they are able to be integrated in the roadway boundary 20a, in particular into the roadway boundary elements 22a. In the exemplary case illustrated in FIG. 1, the radio modules 24a are partially integrated in the roadway boundary elements 22a. In the exemplary case illustrated in FIG. 1, the radio modules 24a are secured to the roadway boundary elements 22a. Alternatively, however, the radio modules 24a can also be arranged separately from the roadway boundary elements 22a, for example behind the roadway boundary elements 22a. The radio modules 24a are arranged on both sides of the roadway 60a, in particular on both sides of the lanes 90a of each travel direction 92a, 94a of the roadway 60a.

In the case illustrated by way of example in FIG. 1, a respective radio module 24a is assigned to a plurality of sensor modules 10a, 10'a positioned separately from one another. In this case, the radio module 24a is configured for collecting data from a plurality of sensor modules 10a, 10'a positioned separately from one another, and for emitting said data in a bundled manner. The radio module 24a and the sensor modules 10a, 10'a form a multi-hop network 98a. In the multi-hop network 98a, the sensor data of the sensor modules 10a, 10'a are respectively forwarded to the neighboring sensor module 10a, 10'a or radio module 24a until they reach a radio module 24a and can be emitted by the radio module 24a. For this purpose, the sensor modules 10a, 10'a have transmitting modules 58a configured for close range communication among the sensor modules 10a, 10'a in the multi-hop network 98a. The transmitting modules 58a can be assigned to each sensor module 10a, 10'a or alternatively can be assigned only to the sensor modules 10a, 10'a to which a radio module 24a has not already been assigned. In the latter case, the radio module 24a can additionally be configured for enabling the close range communication of the sensor module 10a, 10'a assigned to it. Alternatively, each sensor module 10a, 10'a could also be assigned a dedicated radio module 24a which in each case sends only data of the associated sensor module 10a, 10'a.

FIG. 2 shows a plan view of a portion of the traffic management system 50a comprising the sensor module 10a and comprising the radio module 24a. The sensor module 10a is arranged in a close range 56a of the roadway edge 54a. The close range 56a of the roadway edge 54a extends from the roadway edge 54a approximately 10 cm in a direction which points away from the roadway 60a and which runs perpendicularly to a provided travel direction 92a and parallel to the roadway 60a. The sensor module 10a has a sensor 12a. The sensor 12a has a field of view 14a. The sensor 12a is configured for sensing at least one item of information and/or at least one parameter of at least one object 16a, for example vehicle 72a, 80a, 96a, 104a, moving in the field of view 14a of the sensor 12a. The usable field of view 14a of the sensor 12a comprises a portion of a close range 18a of the sensor 12a. In the case illustrated by way of example in FIG. 2, the close range 18 comprises a ring section, having an outer radius 108a of approximately 20 cm and having an inner radius 106a of approximately 10 cm. The radio module 24a is configured at least for emitting to the receivers 26a data based at least on the sensed information and/or on the sensed parameter of the object 16a moving in the field of view 14a of the sensor 12a.

The sensor module 10a has a further sensor 32a. The further sensor 32a has a field of view 36a. The further sensor 32a has a main emission direction 122a. The main emission direction 122a of the further sensor 32a runs in a center of the field of view 36a of the further sensor 32a. In the exemplary case illustrated, the main emission direction 122a of the further sensor 32a is oriented perpendicular to a main emission direction 124a of the sensor 12a of the sensor module 10a. Alternative orientations of the main emission directions 122a, 124a, inter alia even a mutually parallel orientation of the main emission directions 122a, 124a, are conceivable, however. The sensor module 10a, in particular the further sensor 32a, is configured for fog recognition. The sensor module 10a, in particular the further sensor 32a, is configured for determining a fog density. The traffic management device 52a has a fog recognition reflection element 34a. The fog recognition reflection element 34a is arranged at a defined distance from the further sensor 32a in the field of view 36a of the further sensor 32a. The fog recognition reflection element 34a is configured for reflecting a signal of the further sensor 32a to the further sensor 32a and for recognizing fog at least partially on the basis of a change in the output signal caused by droplets of moisture present in the signal propagation path. FIG. 3 shows a further detail of the infrastructure 86a comprising the traffic management system 50a for managing road traffic 62a. The detail of the infrastructure 86a comprises a bottleneck 100a produced by a construction site. At the bottleneck 100a, the traffic of both travel directions 92a, 94a is concentrated on a reduced number of lanes 90a. Additional roadway boundary elements 102a are installed at the bottleneck 100a. The additional roadway boundary elements 102a delimit the roadway 60a and the lanes 90a of the respective travel directions 92a, 94a in the region of the bottleneck 100a. The additional roadway boundary elements 102a are embodied as movable construction site barrier elements. One portion of the movable construction site barrier elements are embodied as concrete guide elements. A further portion of the movable construction site barrier elements are embodied as a warning beacon 174a. An additional further portion of the movable construction site barrier elements are embodied as warning trailers. One portion of the movable construction site barrier elements has sensor modules 10a, 10'a. One portion of the movable construction site barrier elements has radio modules 24a. The distances between the sensor modules 10a, 10'a in the region of the bottleneck 100a are significantly smaller than outside the bottleneck 100a. The distances between the sensor modules 10a, 10'a in the region of the bottleneck 100a are less than 50 m. The distances between the sensor modules 10a, 10'a in the region of the bottleneck 100a are approximately 10 m to 20 m.

FIG. 4 shows a schematic illustration of a portion of the traffic management device 52a comprising the sensor module 10a and comprising the radio module 24a. In the case illustrated in FIG. 4, the sensor module 10a and the radio module 24a are accommodated in a common housing unit 48a. The housing unit 48a is embodied from on opaque material. The housing unit 48a is embodied as watertight. The housing unit 48a is embodied such that it is free of a sensor lens for the sensor 12a of the sensor module 10a. The housing unit 48a is embodied as a hermetically closed housing unit 48a. The sensor module 10a is hermetically encapsulated by the housing unit 48a. The radio module 24a is hermetically encapsulated by the housing unit 48a. The traffic management device 52a is embodied as a stationary traffic management device. The traffic management device 52a is configured for managing at least partially and/or at least time-segment-wise self-driving vehicles 80a, 96a. The sensor module 10a and/or the radio module 24a, in particular the entire housing unit 48a with the sensor module 10a and with the radio module 24a, is dimensioned in such a way that it is able to be integrated in the roadway boundary 20a, in particular into a roadway boundary element 22a. The sensor module 10a and/or the radio module 24a, in particular the entire housing unit 48a with the sensor module 10a and with the radio module 24a, is smaller than a parallelepiped having the dimensions of 10 cm×10 cm×10 cm. A height 110a of the housing unit 48a is less than 10 cm. A depth 112a of the housing unit 48a is less than 10 cm. A width 114a of the housing unit 48a is less than 10 cm.

The sensor 12a is embodied as an ultra-wideband sensor. The ultra-wideband sensor 12a is based on a M-sequence technology. The ultra-wideband sensor 12a operates in a frequency range of between 6 GHz and 8.5 GHz with a bandwidth of at least 2 GHz. The sensor 12a has a transmitting unit 74a. The transmitting unit 74a of the sensor 12a is embodied as an antenna that emits electromagnetic waves/wave packets. The antenna of the transmitting unit 74a of the sensor 12a has an area of at most 5 cm×5 cm. The transmitting unit 74a of the sensor 12a is configured for emitting pseudonoise signals. The transmitting unit 74a of the sensor 12a is configured for emitting M-sequence signals. The transmitting unit 74a of the sensor 12a is configured for emitting M-sequence signals in a frequency band of between 6 GHz and 8.5 GHz with a bandwidth of more than 2 GHz. The sensor 12a has a receiving unit 76a. The receiving unit 76a of the sensor 12a is embodied as an antenna that is excitable by electromagnetic waves/wave packets. The antenna of the receiving unit 76a of the sensor 12a has an area of at most 5 cm×5 cm. The receiving unit 76a of the sensor 12a is configured for detecting reflection signals of the M-sequence signals emitted by the transmitting unit 74a of the sensor 12a. The sensor module 10a has a computing unit 116a. The computing unit 116a is configured at least for analyzing and/or evaluating the reflection signal received by the receiving unit 76a of the sensor 12a. The computing unit 116a is configured at least for generating and/or calculating the M-sequence signal, in particular an M-sequence signal waveform. The computing unit 116a is embodied as a circuit board connected to the transmitting unit 74a of the sensor 12a and to the receiving unit 76a of the sensor 12a. The circuit board of the computing unit 116a has an area of at most 5 cm×5 cm. The sensor 12a, in particular the computing unit 116a is configured for determining a speed of the object 16a moving in the field of view 14a of the sensor 12a from the reflection signal determined by the receiving unit 76a of the sensor 12a. The sensor 12a, in particular the computing unit 116a, is configured for determining a direction of movement of the object 16a moving in the field of view 14a of the sensor 12a from the reflection signal determined by the receiving unit 76a of the sensor 12a. The sensor 12a, in particular the computing unit 116a, is configured for performing a size categorization of the object 16a moving in the field of view 14a of the sensor 12a from the reflection signal determined by the receiving unit 76a of the sensor 12a.

The sensor module 10a has the further sensor 32a. The further sensor 32a is embodied as an ultra-wideband sensor. It is conceivable for the sensor module 10a to have a plurality of further ultra-wideband sensors. The further ultra-wideband sensor 32a is based on an M-sequence technology. The further ultra-wideband sensor 32a operates in a frequency range of between 100 MHz and 6 GHz with a bandwidth of at least 5 GHz. The further sensor 32a has a transmitting unit 118a. The transmitting unit 118a of the further sensor 32a is embodied as an antenna that emits electromagnetic waves/wave packets. The antenna of the transmitting unit 118a of the further sensor 32a has an area of at most 5 cm×5 cm. The transmitting unit 118a of the further sensor 32a is configured for emitting pseudonoise signals. The transmitting unit 118a of the further sensor 32a is configured for emitting M-sequence signals. The transmitting unit 118a of the further sensor 32a is configured for emitting M-sequence signals in a frequency band of between 100 MHz and 6 GHz with a bandwidth of more than 5 GHz. The further sensor 32a has a receiving unit 120a. The receiving unit 120a of the further sensor 32a is embodied as an antenna that is excitable by electromagnetic waves/wave packets. The antenna of the receiving unit 120a of the further sensor 32a has an area of at most 5 cm×5 cm. The receiving unit 120a of the further sensor 32a is configured for detecting reflection signals of the M-sequence signals emitted by the transmitting unit 118a of the further sensor 32a. The computing unit 116a is configured at least for analyzing and/or evaluating the reflection signal received by the receiving unit 120a of the further sensor 32a. The computing unit 116a is embodied as a circuit board connected to the transmitting unit 118a of the further sensor 32a and to the receiving unit 120a of the further sensor 32a. The further sensor 32a, in particular the computing unit 116a, is configured for recognizing fog from the reflection signal determined by the receiving unit 120a of the further sensor 32a.

The sensor module 10a has an ambient condition sensor 38a. The ambient condition sensor 38a comprises at least one temperature sensor. The ambient condition sensor 38a comprises at least one air humidity sensor. The sensor module 10a, in particular the computing unit 116a is configured for determining a fog density from a combination of the reflection signal received by the further sensor 32a and the data of the ambient condition sensor 38a, in particular of the temperature sensor and of the air humidity sensor. The radio module 24a is configured for emitting exact fog density data along the roadway 60a to the receivers 26a.

The sensor module 10a has an acceleration sensor 28a. The sensor module 10a has a movement sensor 30a. The movement sensor 30a is embodied as a tilt sensor, for example. The sensor module 10a, in particular the computing unit 116a is configured to deactivate at least the radio module 24a, at least the sensor 12a and/or at least the transmitting module 58a in the event of the acceleration sensor 28a detecting an acceleration of the sensor module 10a which in particular goes beyond normal accelerations generated by ground vibrations or wind, etc. The sensor module 10a, in particular the computing unit 116a is configured to deactivate at least the radio module 24a, at least the sensor 12a and/or at least the transmitting module 58a in the event of the movement sensor 30a detecting a movement, for example a tilt, of the sensor module 10a which in particular goes beyond normal movements generated by ground vibrations or wind, etc.

The sensor module 10a comprises a position recognition sensor 42a. The position recognition sensor 42a is configured for determining permanently or continuously repeatedly exact, preferably millimeter-accurate, position data, preferably geodata, of the sensor module 10a. The position recognition sensor 42a is configured for receiving signals of a navigation satellite 126a, for example of a GPS satellite. The position recognition sensor 42a is arranged in an upper part of the housing unit 48a. A free field of view to the navigation satellite 126a can be ensured as a result. The radio module 24a is configured for emitting the position data determined by the position recognition sensor 42a, preferably geodata of the sensor module 10a, to the receivers 26a. The sensor module 10a, in particular the computing unit 116a, can be configured for deactivating at least the radio module 24a, at least the sensor 12a and/or at least the transmitting module 58a in the event of a detection of a change in position which in particular goes beyond a few millimeters, for example beyond 10 mm. However, it is also conceivable for at least a portion of the sensor modules 10a, 10'a of the traffic management system 50a, for example sensor modules 10a, 10'a arranged in a tunnel, or all of the sensor modules 10a, 10'a of the traffic management system 50a to be embodied in a manner free of a position recognition sensor 42a and alternatively to be calibrated with millimeter accuracy during mounting.

The sensor module 10a comprises a slippery road surface sensor 40a. The slippery road surface sensor 40a comprises a temperature probe. The slippery road surface sensor 40a, preferably the temperature probe of the slippery road surface sensor 40a, is arranged in proximity to the roadway or introduced into the roadway 60a (cf. also FIG. 1). The slippery road surface sensor 40a is configured for recognizing that the roadway 60a is iced over. The slippery road surface sensor 40a is configured for determining a probability of the roadway 60a being iced over from a combination of temperature data of the temperature probe and moisture data of the ambient condition sensor 38a. The radio module 24a is configured for emitting data of the slippery road surface sensor 40a, in particular information about an iced-over state of the roadway 60a, to the receivers 26a. In the case illustrated by way of example, the slippery road surface sensor 40a is connected to the rest of the sensor module 10a via a cable. Alternatively, however, the slippery road surface sensor 40a could be wirelessly connected to the rest of the sensor module 10a, in particular to the computing unit 116a and/or the radio module 24a. By way of example, the slippery road surface sensor 40a communicates by way of the close range communication of the multi-hop network 98a, in particular with the transmitting modules 58a of the sensor module 10a. For this purpose, the slippery road surface sensor 40a preferably has a separate transmitting module 58a assigned to the slippery road surface sensor 40a.

The traffic management device 52a has an energy harvesting unit 44a. The energy harvesting unit 44a is assigned to the sensor module 10a. With preference, at least one energy harvesting unit 44a is assigned to most of the sensor modules 10a, 10'a of the traffic management system 50a, preferably to each sensor module 10a, 10'a of the traffic management system 50a. The energy harvesting unit 44a is configured for at least partially supplying at least the sensor module 10a with energy. The sensor module 10a has a rechargeable battery 128a. The rechargeable battery 128a is configured for supplying at least a portion of the sensors 12a, 28a, 30a, 32a, 38a, 40a, 42a of the radio module 24a and/or the transmitting module 58a with energy. The energy harvesting unit 44a is configured for at least partially charging the rechargeable battery 128a. The energy harvesting unit 44a comprises a wind generator 46a. The wind generator 46a is configured for drawing energy from an airflow of passing vehicles and converting it into electrical energy.

FIG. 5 shows a schematic flow diagram of a method for managing traffic, in particular traffic of at least partially and/or at least time-segment-wise self-driving vehicles 80a, by means of the traffic management device 52a. In at least one detection step 82a, at least one item of information and/or at least one parameter of at least one object 16a moving in the field of view 14a of the sensor 12a of the sensor module 10a is sensed by the sensor module 10a. In the detection step 82a, the information and/or the parameter are/is sensed by the sensor 12a embodied as an ultra-wideband sensor. At least position and speed data of vehicles which, in particular at high speed, travel past the sensor 12a in the close range 18a of the sensor 12a are detected in the detection step 82a. In at least one further detection step 130a, the slippery road surface sensor 40a senses that the roadway 60a is iced over. In at least one further detection step 132a, a fog density is determined by means of the further sensor 32a and the ambient condition sensor 38a. In a data transfer step 134a, the detected data are communicated to the radio module 24a. The communication of the detected data can take place for example by means of the multi-hop network 98a and/or by means of the transmitting module 58a. In at least one traffic management step 84a, the data based at least on the sensed information and/or at least on the sensed parameter of the at least one movable object 16a and/or the data determined in the further detection steps 130a, 132a are emitted by the radio module 24a to a receiver 26a, for example to an at least partially and/or at least time-segment-wise self-driving vehicle 80a or to a retrofittable receiving module 68a (cf. FIG. 6) of a driver-controlled vehicle 72a. In a method substep 136a of the traffic management step 84a, the data emitted by the radio module 24a are encrypted by means of a blockchain technology or a digital ledger technology (DLT), preferably with an IOTA™-ID, before being emitted to the receivers 26a. In at least one further method substep 138a of the traffic management step 84a, the data received by the receiver 26a, in particular the IOTA™-ID of the received data, are decrypted and verified. In at least one further traffic management step 140a, the verified and decrypted data are used by the at least partially and/or at least time-segment-wise self-driving vehicle 80a for vehicle control and/or are output by the retrofittable receiving module 68a in order to provide the driver of the driver-controlled vehicle 72a with information. In at least one accident recognition step 142a, for the purpose of recognizing accidents, a movement and/or an acceleration of the sensor module 10a, 10'a are/is monitored by the movement sensor 30a and/or by the acceleration sensor 28a. In at least one traffic safety step 144a, a sensor module 10a, 10'a of the traffic management system 50a, in the event of recognition of an accident in the accident recognition step 142a, at least the affected sensor module 10a, 10'a, in particular the sensor 12a of the sensor module 10a, 10'a, the radio module 24a assigned to the sensor module 10a, 10'a and/or the transmitting module 58a of the sensor module 10a, 10'a are/is switched off or put into an accident warning state. In at least one further traffic safety step 146a, the at least partially and/or at least time-segment-wise self-driving vehicle 80a and/or the retrofittable receiving module 68a recognize(s) the accident warning state or a gap in the traffic management system 50a and initiates corresponding accident prevention steps. By way of example, it is conceivable that in the event of recognition of an accident in the accident recognition step 142a, neighboring sensor modules 10a, 10'a, radio modules 24 and/or transmitting modules 58a whose position and acceleration were not influenced by the accident are also switched off or put into the accident warning state.

FIG. 6 shows a traffic information system 78a comprising the traffic management system 50a and comprising the retrofittable receiving module 68a. The retrofittable receiving module 68a is configured for use in driver-controlled vehicles 72a. The retrofittable receiving module 68a is configured for receiving and evaluating data of the traffic management device 52a and/or of the traffic management system 50a. The retrofittable receiving module 68a is configured for outputting the evaluated data of the traffic management device 52a and/or of the traffic management system 50a to the driver of the driver-controlled vehicle 72a by means of an information output device 70a. In the case illustrated, the information output device 70a is embodied as an overhead display. Alternatively, however, the information output device 70a could also be embodied as a smartphone, as a navigation device or as a screen in a dashboard of the driver-controlled vehicle 72a or the like.

FIGS. 7 to 13 show seven further exemplary embodiments of the invention. The following descriptions and the drawings are restricted essentially to the differences between the exemplary embodiments, in which case, with regard to identically designated component parts, in particular in regard to component parts having identical reference signs, reference can also be made, in principle, to the drawings, and/or the description of the other exemplary embodiments, in particular of FIGS. 1 to 6. For differentiating the exemplary embodiments, the letter a is appended to the reference signs of the exemplary embodiment in FIGS. 1 to 6. The letter a is replaced by the letters b to h in the exemplary embodiments in FIGS. 7 to 13.

FIG. 7 shows an alternative traffic management system 50b comprising a traffic management device 52b having the sensor modules 10b comprising ultra-wideband sensors 12b in a use example of traffic management of parking traffic. The sensor modules 10b are arranged between adjacent parking spaces 148b. The reliable close range recognition of moving objects 16b by the ultra-wideband sensors 12b makes it possible to achieve automated parking with particularly small parking distances. As a result, a number of parking spaces 148b per area, for example in a multistorey carpark or next to a roadway 60b, can advantageously be increased.

FIG. 8 shows a second alternative traffic management system 50c comprising a traffic management device 52c having sensor modules 10c comprising ultra-wideband sensors 12c in a use example of traffic management of loading and/or unloading traffic of vehicles 80c on an automobile-carrying ferry 150c. The sensor modules 10c are arranged between adjacent parking lanes 152c, 154c of a loading area of the automobile-carrying ferry 150c. The reliable close range recognition of moving objects 16c by the ultra-wideband sensors 12c makes it possible to achieve automated loading and/or unloading of the automobile-carrying ferry 150c with particular small distances between the vehicles 80c. As a result, a number of vehicles 80c per loading area of the automobile-carrying ferry 150c can advantageously be increased.

FIG. 9 shows a third alternative traffic management system 50d comprising a traffic management device 52d having sensor modules 10d comprising ultra-wideband sensors 12d in a use example of management of railroad traffic 64d. The sensor modules 10d are positioned along a railroad track network 164d. In the exemplary embodiment shown, the sensor modules 10d are integrated in a railroad crossing gate 156d. Trains 158d usually travel past railroad crossing gates 156d at very small distances. The reliable close range recognition of moving objects 16d, in this case trains 158d, by the ultra-wideband sensors 12d makes it possible to ensure that a train 158d traveling past is reliably recognized. The captured data can be used in diverse ways, for example for controlling the train 158d (speed, switches, etc.), for increasing an accuracy of a train timetable (calculation of accurate arrival times, delays, etc.) or for controlling the railroad crossing gate 156d itself. The traffic management device 52d is configured for accurately recognizing the train 158d on the railroad track network 164d by means of the sensor modules 10d. By way of example, temporally precisely controlled lowering and/or raising of railroad crossing gates 156d can be made possible as a result. In particular, a waiting time for a railroad crossing gate 156d to open after the train 158d has passed through can advantageously be reduced. By way of example, it is conceivable for ungated railroad crossings that are safeguarded e.g. only by means of traffic lights to be additionally safeguarded by the traffic management device 52d by virtue of the fact that passage of the train 158d can be reliably reported to the receivers 26d.

FIG. 10 shows a fourth alternative traffic management system 50e comprising a traffic management device 52e having sensor modules 10e comprising ultra-wideband sensors 12a in a use example of management of aircraft taxiing traffic 66e. The sensor modules 10e are arranged along taxiways 160e of an airfield 162e. Aircraft 166e usually have to park very exactly in parking positions of an airport gate 170e in order to enable positioning of a gateway 168a. The reliable close range recognition of moving objects 16e in this case aircraft 166e, by the ultra-wideband sensors 12e advantageously makes it possible to ensure accurate and reliable recognition and control of an aircraft 166e in taxiing traffic.

FIG. 11 shows a fifth alternative traffic management system 50f comprising a traffic management device 52f having sensor modules 10f comprising ultra-wideband sensors 12f. In this exemplary embodiment, the sensor modules 10f are integrated in guide posts 172f of an infrastructure 86f.

FIG. 12 shows a sixth alternative traffic management system 50g comprising a traffic management device 52g having sensor modules 10g comprising ultra-wideband sensors 12g in a further use example of management of road traffic 62g, in particular urban road traffic 62g. An urban infrastructure 86g has a roadway 60g and a sidewalk 176g running next to the roadway 60g. In the case illustrated in FIG. 12, the infrastructure 86g additionally has a bus stop bay 178g. The bus stop bay 178g is embodied as a local widening of the roadway 60g in which an omnibus can stop without obstructing flowing traffic. The bus stop bay 178g constitutes a safety-critical region where waiting passengers may be situated, for example. The bus stop bay 178g is arranged directly before an intersection 180g of the roadway 60g. The sensor module 10g is arranged at the start of the bus stop bay 178g. The sensor module 10g is arranged on a side of the sidewalk 176g facing away from the roadway 60g. The sensor module 10g has a GPS point 182g. The GPS point 182g is positioned at a roadway edge 54g of the roadway 60g. A further sensor module 10'g is arranged at the end of the bus stop bay 178g. The further sensor module 10'g is arranged on the side of the sidewalk 176g facing away from the roadway 60g. The further sensor module 10'g has a further GPS point 184g. The further GPS point 184g is positioned at the roadway edge 54g of the roadway 60g. The GPS points 182*g*, 184*g* can also be embodied as geographical position points of other geodata systems. At least one of the sensor modules 10*g*, 10'*g* has a radio module 24*g*. The radio module 24*g* is configured for emitting position data of the GPS points 182*g*, 184*g* of the sensor modules 10*g*, 10'*g* to receivers 26*g*. The traffic management device 52*g*, in particular the sensor modules 10*g*, 10'*g* and the radio module 24*g*, are configured, in particular by means of outputting exact position data enabling the reliable determination of the roadway edge 54*g* of the roadway 60*g* including in the region of the bus stop bay 178*g*, for guiding a vehicle 80*g* past the bus stop bay 178*g*, preferably without the vehicle 80*g* steering into the bus stop bay 178*g*. Particularly in the case of self-driving vehicles having internal environment monitoring and environment recognition sensors, it can happen that such a bus stop bay 178*g* is misinterpreted as a turning-off lane for the nearby intersection 180*g*. Such misinterpretations can advantageously be avoided by means of the invention described. In particular, it is conceivable for additional items of information about the bus stop bay 178*g*, for example about the location of the bus stop bay 178*g*, to be emitted to the receivers 26*g* by means of the radio module 24*g*.

FIG. 13 shows a plan view of a portion of a seventh alternative traffic management system 50*h* comprising the sensor module 10*h* and comprising the radio module 24*h*, which is arranged in the vicinity of a roadway edge 54*h* of a roadway 60*h* with travel direction 92*h*. The sensor module 10*h* has a sensor 12*h* embodied as an ultra-wideband sensor. The sensor 12*h* has a field of view 14*h*. The ultra-wideband sensor is configured for vehicle classification of passing vehicles 72*h*, 80*h*, 96*h*, 104*h*. The radio module 24*h* is configured at least for emitting vehicle classification data determined by the ultra-wideband sensor to receivers.

The sensor module 10*h* has a camera 186*h* in addition to the ultra-wideband sensor. The camera 186*h* is configured for recognizing objects 16*h* moving in a field of view 188*h* of the camera 186*h*. The camera 186*h* is embodied as a classification camera configured for classifying the recognized objects 16*h* in a plurality of different vehicle classes. The classification of objects 16*h* that is performed by the camera 186*h* is configured for training and/or for supervision of the classification of the objects 16*h* that is performed by the ultra-wideband sensor. The vehicle classification determined by the camera 186*h* is compared, internally in the sensor module, with the vehicle classification determined by the ultra-wideband sensor. The classification determination by the ultra-wideband sensor is made more precise and improved on the basis of the comparison. The radio module 24*h* is configured at least for emitting vehicle classification data determined by the camera 186*h* to receivers (e.g. upon request by a readout device).

The invention claimed is:

1. A Car2X system for managing at least partially and/or at least time-segment-wise self-driving vehicles, comprising:
a stationary traffic management device, which is fixedly connected to a road network or positioned in a stationary manner relative to the road network,
the stationary traffic management device is configured for:
a mapping of positions and/or of movement vectors of captured objects as captured data and/or processed data,
outputting the captured data and/or processed data to the at least partially and/or at least time-segment-wise self-driving vehicles,
the stationary traffic management device comprising a plurality of ultra-wideband radar sensors,
each ultra wide-band sensor of the plurality of ultra-wideband radar sensors being configured to emit electromagnetic wave packets having a large bandwidth,
each ultra wide-band sensor of the plurality of ultra-wideband sensors being configured to detect reflection signals of the emitted electromagnetic wave packets, and
each ultra wide-band sensor of the plurality of ultra-wideband sensors being configured to sense frequency differences of a corresponding reflection signal of the reflection signals and/or time of flight differences of the corresponding reflection signal in order to detect distances of reflecting objects moving in a field of view of the ultra-wideband radar sensor,
the stationary traffic management device further comprising
at least one radio module having a transmitting antenna,
the at least one radio module is configured for emitting to at least one of the at least partially and/or at least time-segment-wise self-driving vehicles position and/or speed of one or more of the objects sensed by the ultra-wideband radar sensor and exact position data of the ultra-wideband radar sensors,
the Car2X system is configured for guiding the at least partially and/or at least time-segment-wise self-driving vehicles at least at roadway bottlenecks of the road network, the Car2X system further comprising a plurality of roadway boundary elements, forming at least a portion of a roadway boundary of the road network,
the plurality of ultra-wideband radar sensors are integrated in the plurality of roadway boundary elements,
the plurality of roadway boundary elements with the plurality of ultra-wideband radar sensors delimit a roadway of the road network on at least one side in a region of a roadway bottleneck of the road network.

2. The Car2X system as claimed in claim 1, wherein the ultra-wideband radar sensor emits M-sequence signals.

3. The Car2X system as claimed in claim 1, wherein a usable portion of the field of view of the ultra-wideband radar sensor comprises at least a portion of a close range of the ultra-wideband radar sensor.

4. The Car2X system as claimed in claim 1, wherein at least one sensor module having at least one of the plurality of ultra-wideband radar sensors is dimensioned in such a way that it is able to be integrated in a guard rail, a guide post, a railroad crossing gate and/or a warning beacon.

5. The Car2X system as claimed in claim 1, wherein at least the data emitted by the at least one radio module are encrypted by means of a blockchain technology or digital ledger technology (DLT).

6. The Car2X system as claimed in claim 1, wherein the at least one radio module is assignable to a plurality of sensor modules that are positionable separately from one another, and/or in that the at least one radio module is configured for emitting data of the plurality of sensor modules that are positionable separately from one another, the sensor modules each having at least one of the plurality of ultra-wideband radar sensors.

7. The Car2X system as claimed in claim 1, wherein a sensor module comprises at least one acceleration sensor and/or at least one movement sensor for a monitoring of a movement and/or an acceleration of the sensor module.

8. The Car2X system as claimed in claim 1, wherein the ultra-wideband radar sensor is configured for determining a speed of the objects moving in the field of view of the ultra-wideband radar sensor.

9. The Car2X system as claimed in claim 1, wherein the ultra-wideband radar sensor is configured for determining a direction of movement of the objects moving in the field of view of the ultra-wideband radar sensor.

10. The Car2X system as claimed in claim 1, wherein the ultra-wideband radar sensor is configured for performing a size categorization of the objects moving in the field of view of the ultra-wideband radar sensor.

11. The Car2X system as claimed in claim 1, wherein a sensor module has at least one further ultra-wideband radar sensor, with the traffic management device comprising a fog recognition reflection element arranged at a defined distance from the further ultra-wideband radar sensor in the field of view of the further ultra-wideband radar sensor, the sensor module having at least one of the plurality of ultra-wideband radar sensors.

12. The Car2X system as claimed in claim 1, wherein a sensor module having at least one of the plurality of ultra-wideband radar sensors comprises at least one ambient condition sensor.

13. The Car2X system as claimed in claim 11, wherein the sensor module is configured for determining a fog density.

14. The Car2X system as claimed in claim 1, wherein a sensor module having at least one of the plurality of ultra-wideband radar sensors comprises at least one slippery road surface sensor.

15. The Car2X system as claimed in claim 1, wherein a sensor module having at least one of the plurality of ultra-wideband radar sensors comprises at least one position recognition sensor.

16. The Car2X system as claimed in claim 1, further comprising an energy harvesting unit for at least partial energy supply of at least a sensor module having at least one of the plurality of ultra-wideband radar sensors.

17. The Car2X system as claimed in claim 16, wherein the energy harvesting unit comprises at least one wind generator.

18. The Car2X system as claimed in claim 1, further comprising an opaque and/or hermetically closed housing unit.

19. The Car2X system as claimed in claim 1, wherein a sensor module has, in addition to the ultra-wideband radar sensor, at least one camera that is configured for recognizing at least one object moving in a field of view of the camera.

20. The Car2X system as claimed in claim 19, wherein the camera is embodied as a classification camera configured for classifying the recognized at least one object in a plurality of different vehicle classes.

21. The Car2X system as claimed in claim 20, wherein the classification of at least one object that is performed by the camera is configured at least for training and/or for supervision of a classification of the at least one object that is performed by the ultra-wideband radar sensor.

22. The Car2X system as claimed in claim 1, wherein at least one sensor module having at least one of the plurality of ultra-wideband radar sensors is/are arranged in a close range of a roadway edge.

23. The Car2X system as claimed in claim 1, wherein at least one roadway boundary element, in which a sensor module having at least one of the plurality of ultra-wideband radar sensors is integrated, is embodied as a movable construction site barrier element, as a guard rail, as a guide post and/or as a warning beacon.

24. The Car2X system as claimed in claim 1, wherein at least sensor modules having the plurality of ultra-wideband radar sensors are arranged on both sides of a roadway.

25. A retrofittable receiving module configured for receiving data of the Car2X system as claimed in claim 1, for evaluating said data and for outputting them to a driver of a driver-controlled vehicle by means of an information output device.

* * * * *